United States Patent
Koh

(10) Patent No.: US 11,361,796 B2
(45) Date of Patent: Jun. 14, 2022

(54) DISPLAY CONTROL DEVICE, OPERATION DETECTION DEVICE, DISPLAY CONTROL METHOD, AND DISPLAY CONTROL PROGRAM

(71) Applicant: PIONEER CORPORATION, Tokyo (JP)

(72) Inventor: Yoshihiro Koh, Tokyo (JP)

(73) Assignee: PIONEER CORPORATION

( * ) Notice: Subject to any disclaimer, the term of this patent is extended or adjusted under 35 U.S.C. 154(b) by 0 days.

(21) Appl. No.: 17/418,702

(22) PCT Filed: Dec. 20, 2019

(86) PCT No.: PCT/JP2019/050092
§ 371 (c)(1),
(2) Date: Jun. 25, 2021

(87) PCT Pub. No.: WO2020/137881
PCT Pub. Date: Jul. 2, 2020

(65) Prior Publication Data
US 2022/0068309 A1 Mar. 3, 2022

(30) Foreign Application Priority Data
Dec. 26, 2018 (JP) .............................. JP2018-243419

(51) Int. Cl.
*H04N 5/783* (2006.01)
*G11B 27/00* (2006.01)
*G06F 3/14* (2006.01)

(52) U.S. Cl.
CPC .............. *G11B 27/005* (2013.01); *G06F 3/14* (2013.01)

(58) Field of Classification Search
CPC ..... G06F 3/0485; G06F 3/1423; G09G 5/346; G09G 5/14; G09G 2380/12; G09G 2380/10; G09G 2370/02; G09G 2360/04; G09G 2354/00; G09G 2352/00;
(Continued)

(56) References Cited

U.S. PATENT DOCUMENTS 8,155,501 B2 *  4/2012  Oda ....................... G06Q 30/06
                                                    386/248

FOREIGN PATENT DOCUMENTS

| JP | H07117561 A |   | 5/1995 |
| JP | 2006060752 A | * | 3/2006 |
| JP | 2010166514 A | * | 7/2010 |

(Continued)

*Primary Examiner* — Robert Chevalier
(74) *Attorney, Agent, or Firm* — Procopio, Cory, Hargreaves & Savitch LLP

(57) ABSTRACT

To provide a display control device and the like that enable a passenger to perform, free from a feeling of strangeness, an operation of displaying an image shot before or after an image being displayed by an operator when an image in which an outside of a moving body is shot is displayed in the moving body.

The display control device displays images obtained by shooting the outside of a moving body in the moving body, detects the direction of movement of the moving body, switches, in accordance with the movement direction, the first operation between to be a forward operation of displaying an image shot after an image being displayed and to be a rewind operation of displaying an image shot before an image being displayed, displays an image in accordance with the forward operation or the rewind operation.

8 Claims, 19 Drawing Sheets

(58) Field of Classification Search
CPC .............. G09G 2340/0492; B60R 1/00; B60R 2300/302; B60R 2300/105
USPC ................ 386/230, 343, 345, 347, 350, 353
See application file for complete search history.

(56) References Cited

FOREIGN PATENT DOCUMENTS

| | | |
|---|---|---|
| JP | 2017135444 A | 8/2017 |
| JP | 2018038009 A | 3/2018 |

* cited by examiner

DISPLAY CONTROL DEVICE, OPERATION DETECTION DEVICE, DISPLAY CONTROL METHOD, AND DISPLAY CONTROL PROGRAM

CROSS-REFERENCE TO RELATED APPLICATIONS

This application is a U.S. National Stage entry of PCT Application No: PCT/JP2019/050092 filed Dec. 20, 2019, which claims priority to Japanese Patent Application No. 2018-243419 filed Dec. 26, 2018, the contents of which are incorporated herein by reference.

TECHNICAL FIELD

The present application relates to the technical field of a display control device that displays an image obtained by shooting an outside of a moving body in the moving body.

BACKGROUND ART

Patent Literature 1 discloses a technology of shooting a moving image of an outside of a moving body and outputting a corresponding past moving image when a passenger specifies a time of day or an object. However, it is sometimes difficult to specify a portion that a passenger wants to view by a time of day or an object. For example, it is difficult to accurately specify whether the portion that the passenger wants to view appears 3 minutes and 10 seconds before or 3 minutes and 30 seconds before, and it is also difficult to specify the object when there are a plurality of similar objects.

Therefore, for example, if images (thumbnails) obtained by clipping a moving image at a predetermined time interval and reducing them are displayed side by side together with the moving image, and a portion corresponding to the thumbnail selected by the passenger is reproduced, the user can view the portion by selecting the thumbnail corresponding to the portion the user wants to view.

CITATION LIST

Patent Literature

Patent Literature 1: JP 2018-38009 A

SUMMARY OF INVENTION

Technical Problem

However, for example, when the thumbnails are displayed side by side in the lateral direction, it is common in the prior art to display the left side and the right side in association with the past and the present, respectively, where the passenger on board a moving body in motion sometimes has a feeling of strangeness when the present and the past in the order of the thumbnails do not correspond to the movement direction of the moving body, and sometimes erroneously select the thumbnail.

Therefore, in view of one example of such a problem, it is an object of the present invention to provide a display control device and the like that enable a passenger to perform, free from a feeling of strangeness, an operation of displaying an image shot before or after an image being displayed by an operator when an image in which an outside of a moving body is shot is displayed in the moving body.

Solution to Problem

An invention described in claim 1 is a display control device comprising: a first display control means that displays an image obtained by shooting an outside of a moving body in the moving body; an operation detection means that detects a first operation; a movement direction detection means that detects a movement direction, which is a movement direction of the moving body; and a switching means that switches, in accordance with the movement direction, the first operation between to be a forward operation of displaying an image shot after an image being displayed and to be a rewind operation of displaying an image shot before an image being displayed, wherein the first display control means displays an image in accordance with the forward operation or the rewind operation.

An invention described in claim 8 is a display control method by a display control device, the display control method comprising: a first display control step of displaying an image obtained by shooting an outside of a moving body in the moving body; an operation detection step of detecting a first operation; a movement direction detection step of detecting a movement direction, which is a movement direction of the moving body; and a switching step of switching, in accordance with the movement direction, the first operation between to be a forward operation of displaying an image shot after an image being displayed and to be a rewind operation of displaying an image shot before an image being displayed, wherein the first display control step is of displaying an image in accordance with the forward operation or the rewind operation.

An invention described in claim 9 is a display control program that causes a computer included in a display control device to function as: a first display control means that displays an image obtained by shooting an outside of a moving body in the moving body; an operation detection means that detects a first operation; a movement direction detection means that detects a movement direction, which is a movement direction of the moving body; and a switching means that switches, in accordance with the movement direction, the first operation between to be a forward operation of displaying an image shot after an image being displayed and to be a rewind operation of displaying an image shot before an image being displayed, wherein the first display control means displays an image in accordance with the forward operation or the rewind operation.

Figure 14:
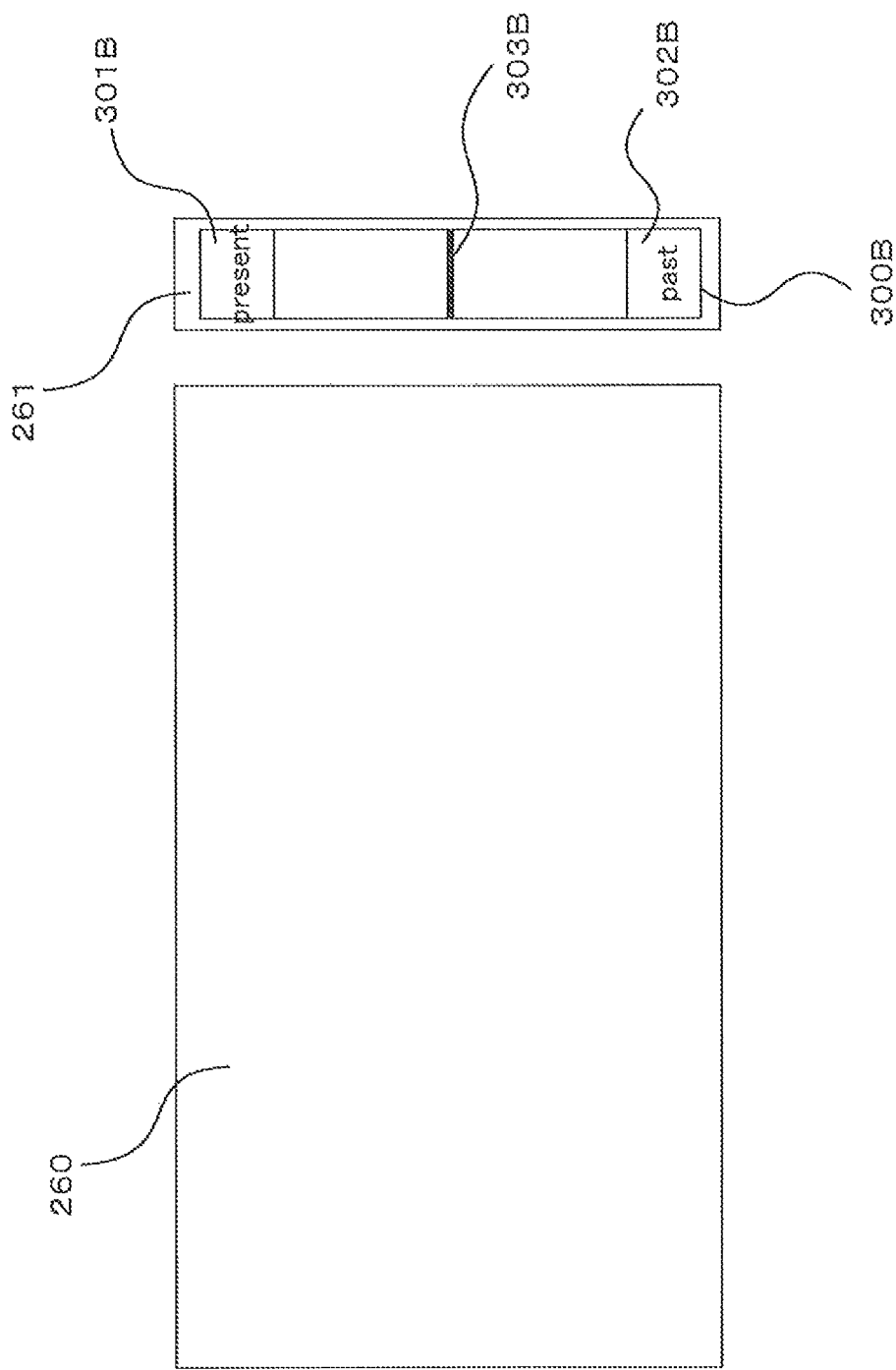

FIG. 14 is a view showing an example of a display 260 that displays an image on a front surface portion of an own vehicle and a display 261 that displays a reproduction scroll bar 300B in the variation 2-2.

Figure 15:
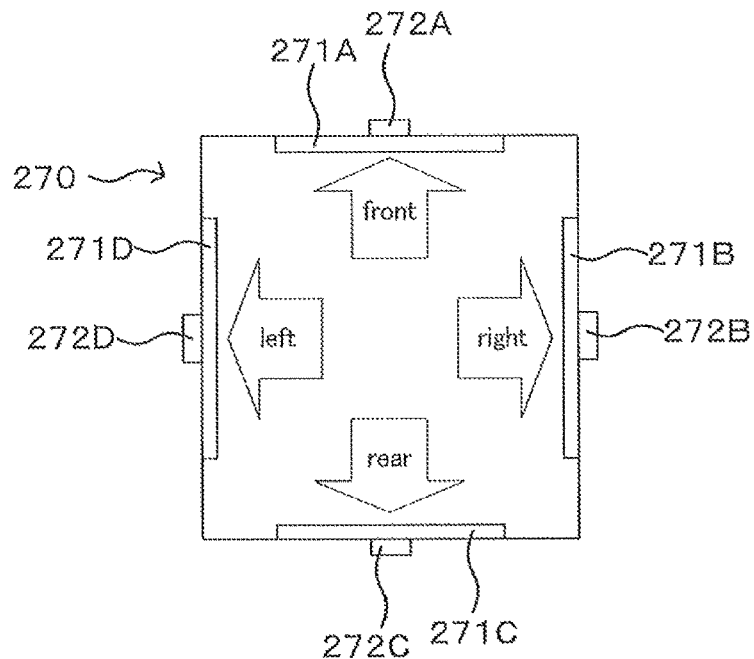

FIG. 15 is a view of an example of an outline of a vehicle 270 in the variation 2-3 as viewed from above.

Figure 16:
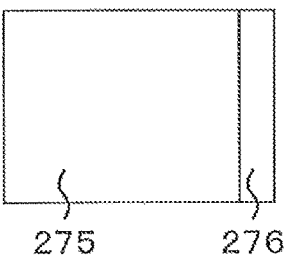

FIG. 16 is a view showing an example of a display format for each movement direction of displays 271A, 271BA, 271C, and 271D installed in the vehicle 270 in the variation 2-3.

Figure 17:
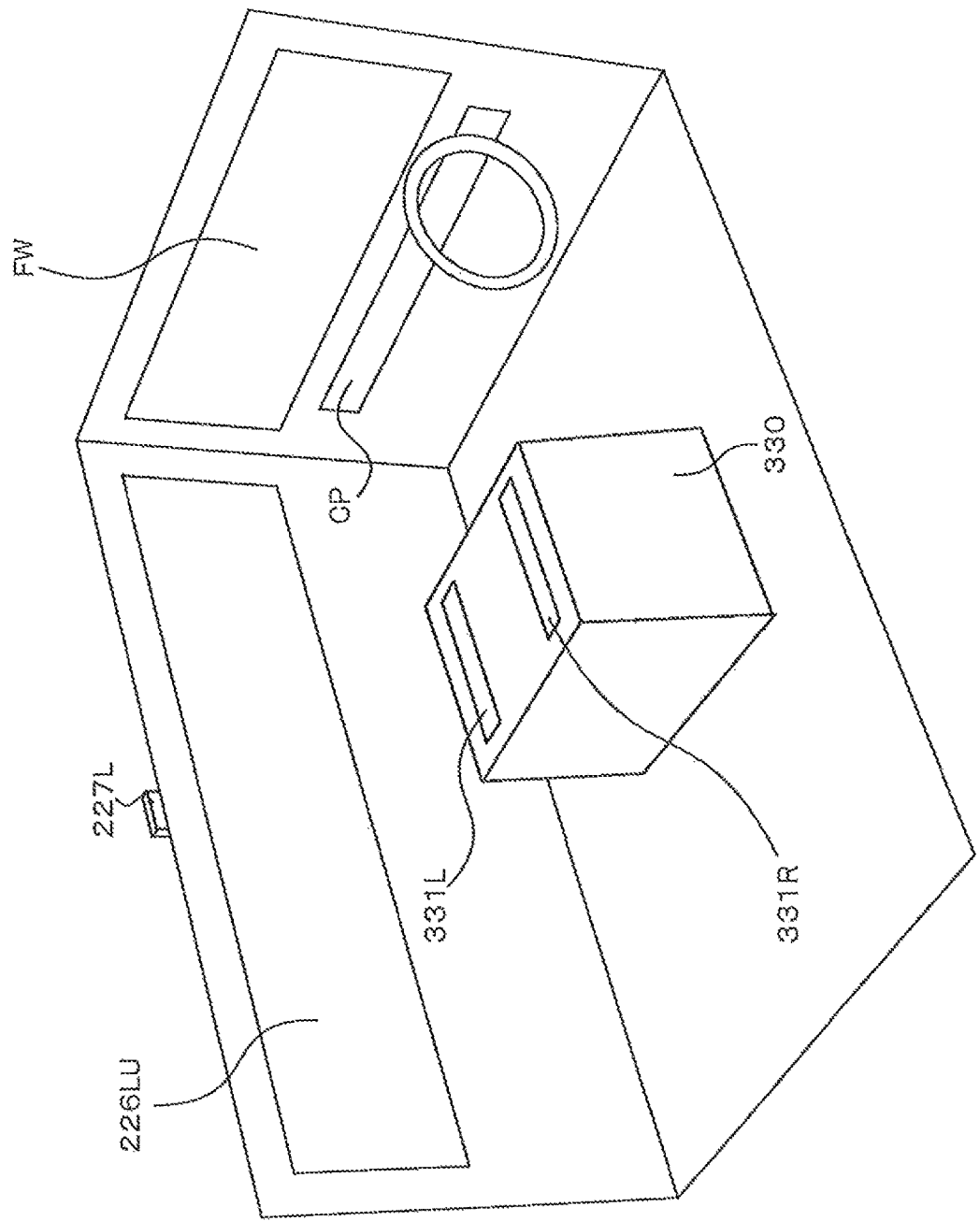

FIG. 17 is a schematic diagram showing an example of a vehicle (mainly inside thereof) equipped with the display control device 200 in the variation 4.

Figure 18:
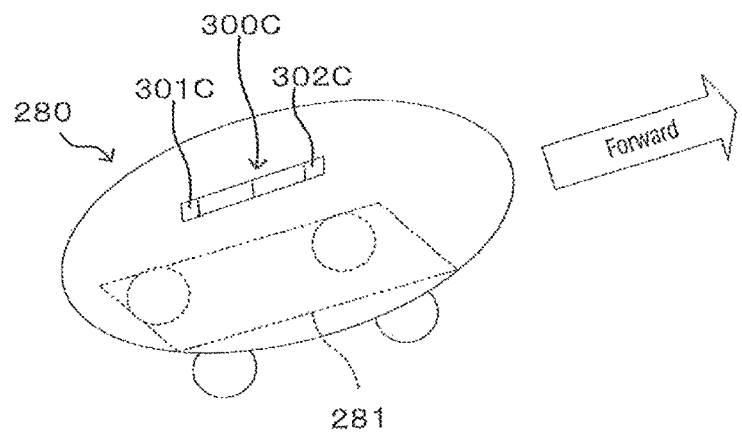

FIG. 18 is a view showing an example of a vehicle 280 having an entire inner wall covered with a seamless display in the variation 9-1.

Figure 19:
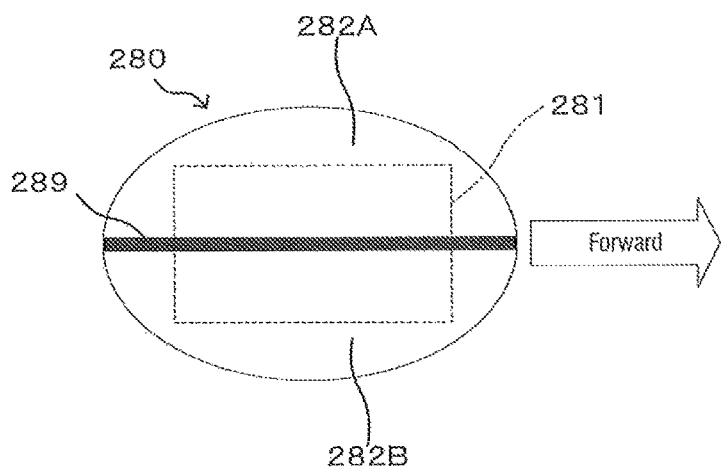

FIG. 19 is a view of an example of the vehicle 280 having the entire inner wall covered with two displays and having a display joint 289 present in a front-rear direction of the vehicle in the variation 9-2 as viewed from above.

Figure 20:
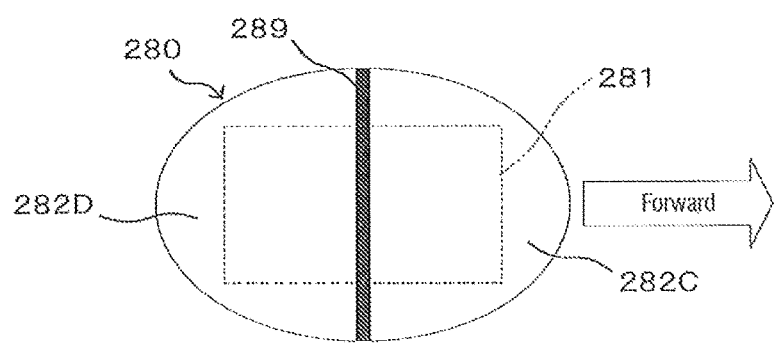

FIG. 20 is a view of an example of the vehicle 280 having the entire inner wall covered with the two displays and having the display joint 289 present in a right-left direction of the vehicle in the variation 9-3 as viewed from above.

Figure 21:
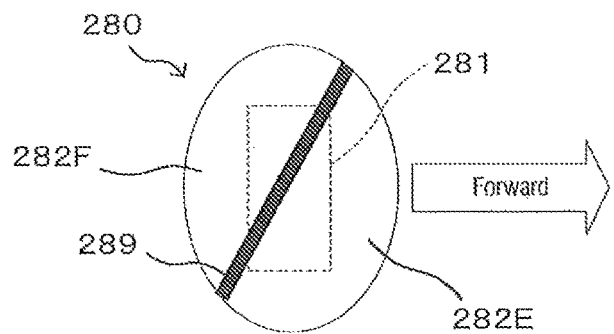

FIG. 21 is a view of an example of a horizontally long vehicle 280 having the entire inner wall covered with the two displays and having the display joint 289 present in an oblique direction of the vehicle in the variation 9-4 as viewed from above.

Figure 22:
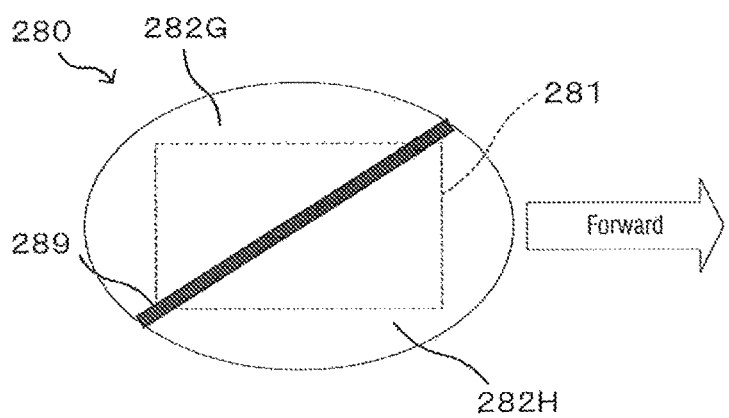

FIG. 22 is a view of an example of a vertically long vehicle 280 having the entire inner wall covered with the two displays and having the display joint 289 present in an oblique direction of the vehicle in the variation 9-5 as viewed from above.

Figure 23:
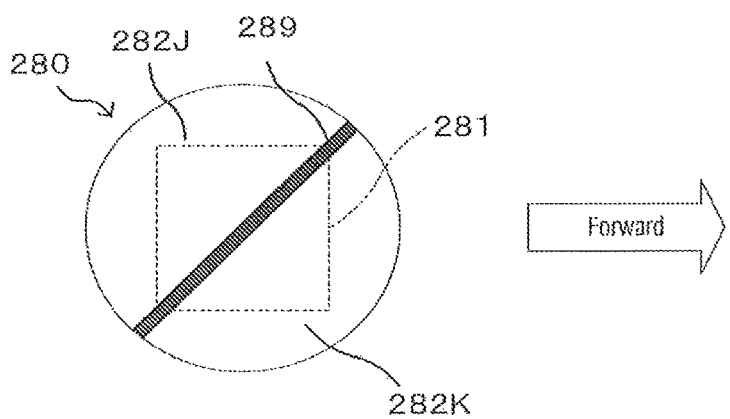

FIG. 23 is a view of an example of a vehicle 280 substantially the same in length in the vertical and horizontal directions having the entire inner wall covered with the two displays and having the display joint 289 present in an oblique direction of the vehicle in the variation 9-6 as viewed from above.

Figure 24:
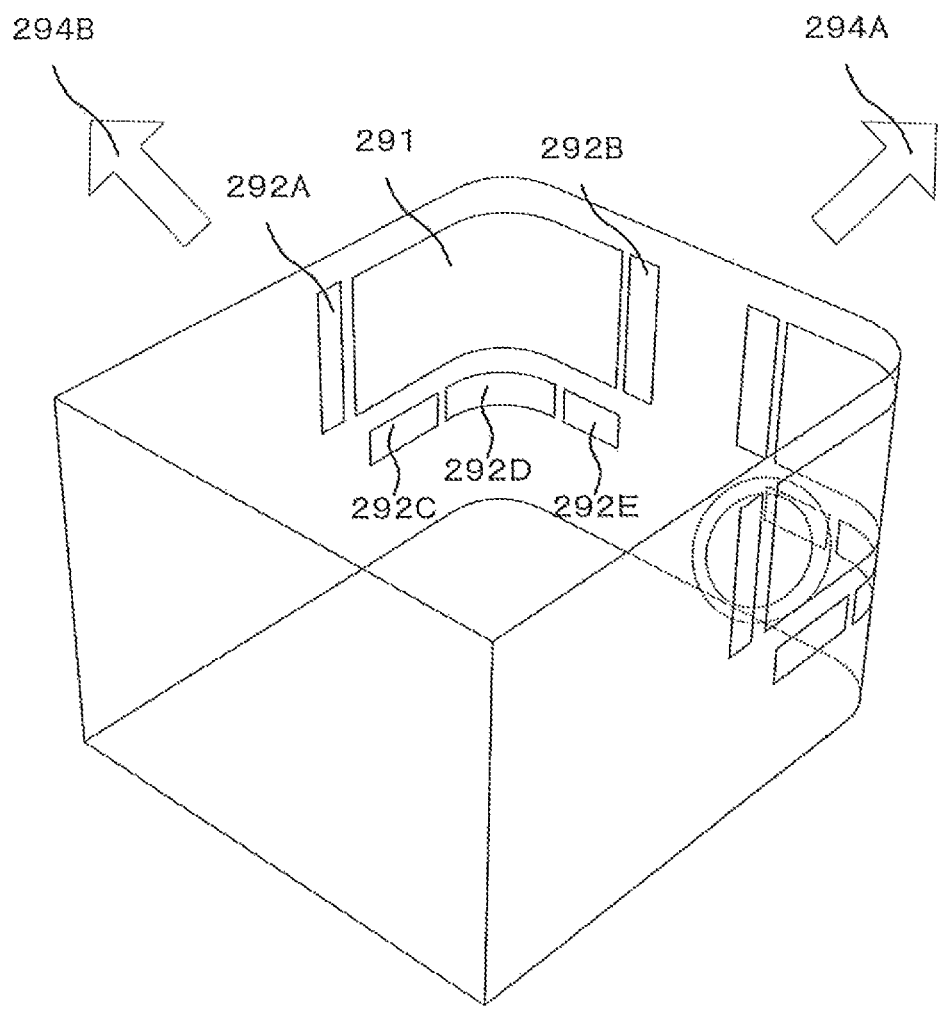

FIG. 24 is a schematic view showing an example of a vehicle having a display installed over a plurality of side surface portions in the vehicle in the variation 10.

MODES FOR CARRYING OUT THE INVENTION

An embodiment for carrying out the invention of the present application will be described with reference to FIG. 1.

Figure 1:
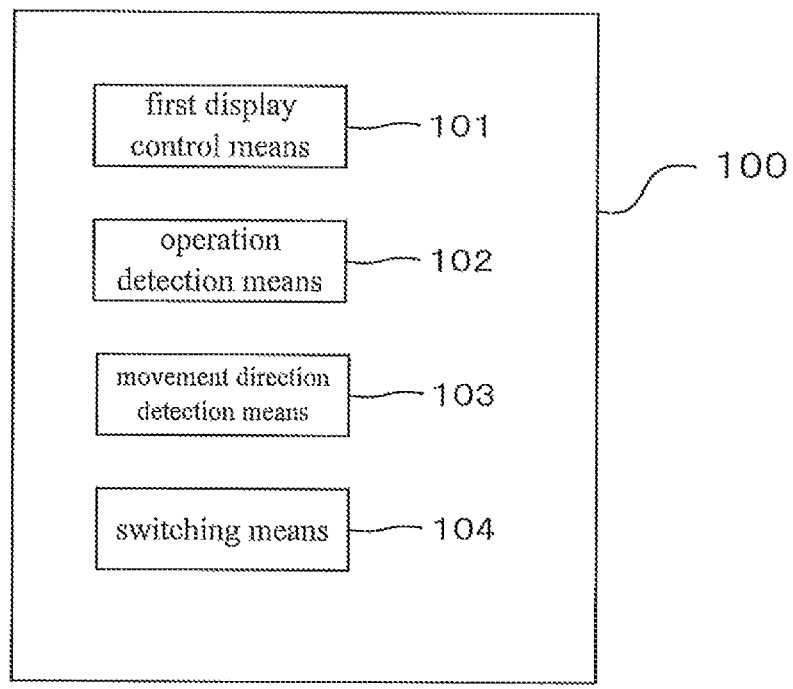
FIG. 1 is a block diagram showing a configuration example of a display control device 1 in an embodiment.

As shown in FIG. 1, a display control device 100 includes a first display control means 101, an operation detection means 102, a movement direction detection means 103, and a switching means 104.

The first display control means 101 displays an image obtained by shooting an outside of a moving body in the moving body.

The operation detection means 102 detects a first operation.

The movement direction detection means 103 detects the movement direction, which is a direction in which the moving body moves.

The switching means 104 switches, in accordance with the movement direction, the first operation between to be a forward operation of displaying an image shot after the image being displayed and to be a rewind operation of displaying an image shot before the image being displayed.

Then, the first display control means 101 displays an image corresponding to the forward operation or the rewind operation.

According to the display control device 100, when an image captured by shooting the outside of the moving body is displayed in the moving body, it is switched in accordance with the movement direction whether the first operation is a forward operation of displaying an image shot after the image being displayed or a rewind operation of displaying an image shot before the image being displayed, and an image corresponding to the forward operation or the rewind operation is displayed. Therefore, since the forward operation and the rewind operation can be switched in accordance with the movement direction so that the passenger can intuitively operate free from a feeling of strangeness, the operator can intuitively operate free from a feeling of strangeness the operation of displaying an image shot before or after the image being displayed.

EXAMPLES

1. First Example

Next, the first example corresponding to the above-described embodiment will be described. Note that the first example described below is an example in a case where the invention of the present application is applied to the display control device 200 mounted on a vehicle. Hereinafter, the vehicle equipped with the display control device 200 is sometimes referred to as an own vehicle.

1.1. Configuration of Display Control Device 200

Figure 2:
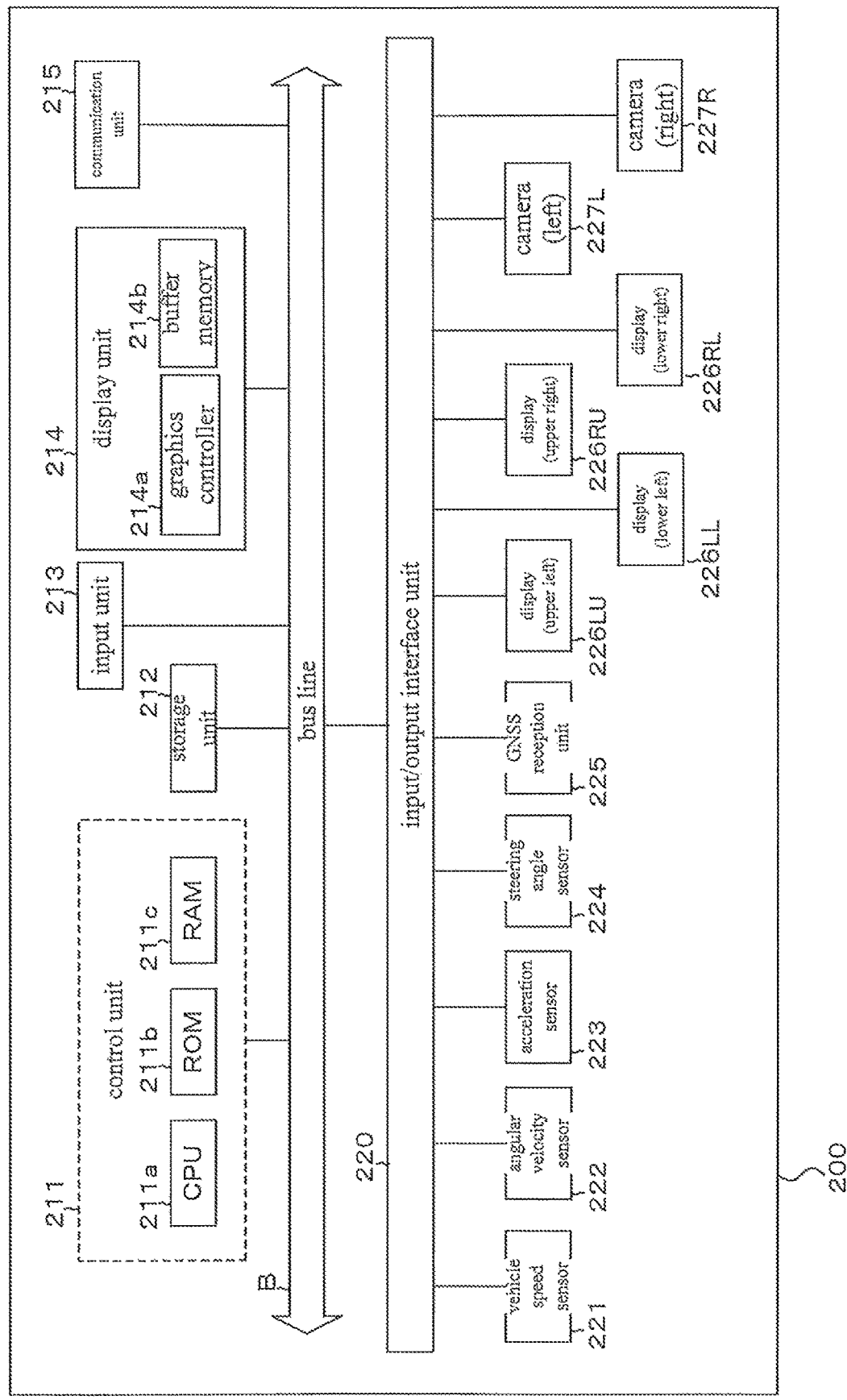
FIG. 2 is a block diagram showing a configuration example of a display control device 200 in a first example.
Figure 3:
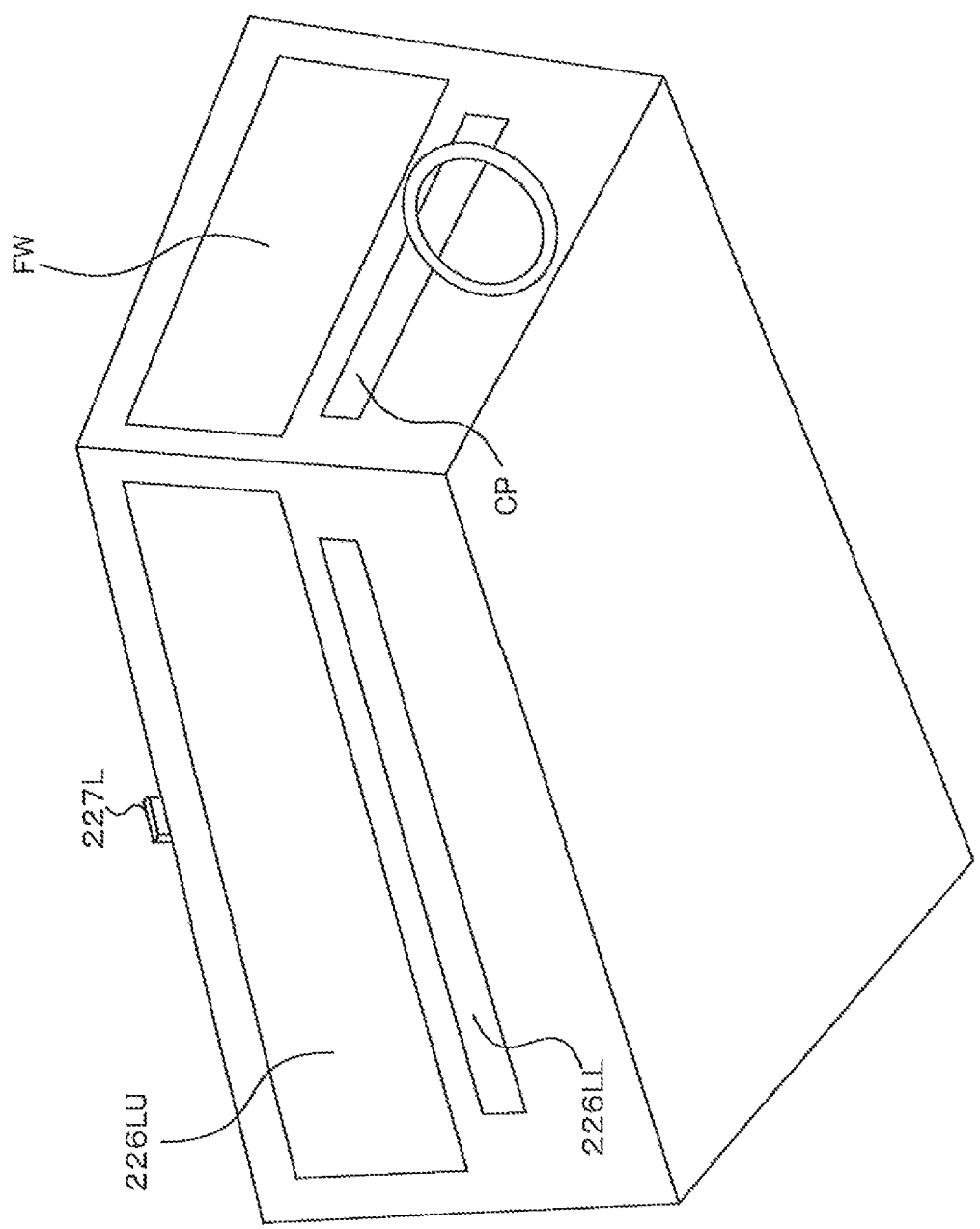
FIG. 3 is a schematic diagram showing an example of a vehicle (mainly inside thereof) equipped with the display control device 200 in the first example.
Figure 4:
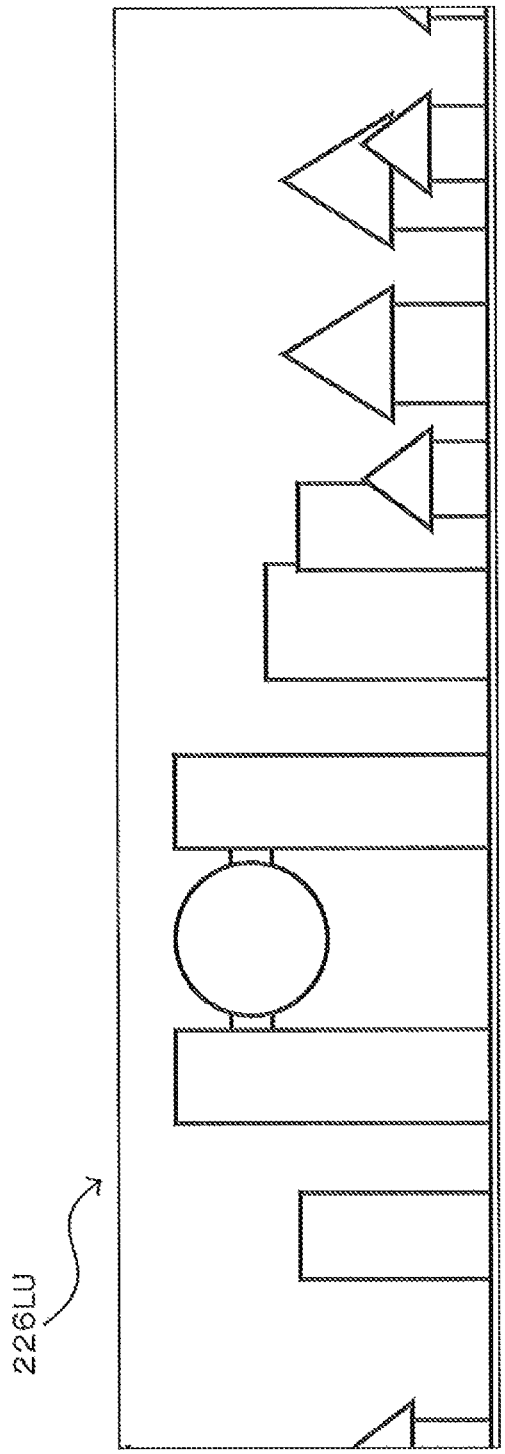
FIG. 4 is a view showing a display example of a display (upper left) 226LU in the first example.

The configuration of the display control device 200 in the first example will be described with reference to FIGS. 2 to 8. FIG. 2 is a block diagram showing a configuration example of the display control device 200, and FIG. 3 is a schematic diagram showing an example of a vehicle (mainly inside thereof) equipped with the display control device 200. Note that in the vehicle shown in FIG. 3, the direction in which a windshield FW and a control panel CP are installed corresponds to a forward direction. FIG. 4 is a view showing a display example of a display (upper left) 226LU, and FIGS. 5 to 8 are views showing a display example of the reproduction scroll bar displayed on a display (lower left) 226LL.

As shown in FIG. 2, the display control device 200 is configured to include a control unit 211, a storage unit 212 including a hard disk drive (HDD), a solid state drive (SSD) and the like, an input unit 213 including a keyboard and a touchscreen and the like, a display unit 214, a communication unit 215, a bus line B, an input/output interface unit 220, a vehicle speed sensor 221, an angular velocity sensor 222, an acceleration sensor 223, a steering angle sensor 224, a global navigation satellite system (GNSS) reception unit 225, the display (upper left) 226LU, the display (lower left) 226LL, a display (upper right) 226RU, a display (lower right) 226RL, a camera (left) 227L, and a camera (right) 227R. Note that the display (upper left) 226LU, the display (lower left) 226LL, the display (upper right) 226RU, and the display (lower right) 226RL are sometimes collectively referred to as a display 226. Furthermore, the camera (left) 227L and the camera (right) 227R are sometimes collectively referred to as a camera 227.

The control unit 211 includes a CPU 211a that controls the entire control unit 211, a ROM 211b in which a control program and the like that controls the control unit 211 are stored in advance, and a RAM 211c that temporarily stores various data. Then, the CPU 211a functions as various means by reading and executing various programs stored in the ROM 211b and the storage unit 212. The control unit 211 or the CPU 211a corresponds to a "computer".

The storage unit 212 stores various programs such as an operating system (OS) and an application program, and data and information used in the various programs. The OS manages a system clock and maintains accurate time by periodically connecting to and synchronizing with the time server. In addition, the storage unit 212 stores a display control program for displaying an image on the display 226. Note that the various programs may be acquired from, for example, a server device or the like via a network, or may be read from a recording medium such as a CD, a DVD, or a USB memory.

The storage unit 212 stores images of the outside of the own vehicle shot by each of the camera (left) 227L and the camera (right) 227R. Each image is stored so that the shooting time of the image can be specified. For example, the image itself may hold the shooting time as attribute information, or it the image and the shooting time may be managed by a table or the like that associates together. When an image is shot in a moving image format, the image is stored so that the shooting time can be specified for each of the plurality of continuous images constituting the moving image. Furthermore, the storage unit 212 stores an image obtained by reducing each image (hereinafter, sometimes referred to as a thumbnail image) in association with the image. The shooting time can be, for example, the shooting time at the time point when the storage unit 212 stores the image.

The input unit 213 receives an input operation by the operator and transmits, to the control unit 211, an operation signal indicating the operation content.

The display unit 214 includes a graphics controller 214a and a buffer memory 214b including a memory such as a video RAM (VRAM). In this configuration, the graphics controller 214a controls the display unit 214 and the display 226 based on the control information sent from the control unit 211 via the bus line B. In addition, the buffer memory 214b temporarily stores image data that can be immediately displayed on each display 226. Then, an image is displayed on each display 226 based on the image data output from the graphics controller 214a.

The display unit 214 performs processing of displaying an image on the display (upper left) 226LU and the display (upper right) 226RU under the control of the control unit 211. Furthermore, the display unit 214 performs processing of displaying the reproduction scroll bar described later on the display (lower left) 226LL and the display (lower right) 226RL.

The vehicle speed sensor 221 detects the current speed of the own vehicle using, for example, a speed detection processing or the like using a vehicle speed pulse or the like acquired from the own vehicle equipped with the display control device 200, and outputs speed data. The angular velocity sensor 222 detects, for example, an angular velocity of a direction change of the own vehicle, and outputs angular velocity data and relative orientation data per unit time. The acceleration sensor 223 detects acceleration in, for example, the front-rear direction of the own vehicle, and outputs acceleration data per unit time or the like. The steering angle sensor 224 detects a steering angle of the own vehicle and outputs steering angle data and the like. The GNSS reception unit 225 receives navigation radio waves from a GNSS satellite and outputs GNSS positioning data.

The control unit 211 is connected to the vehicle speed sensor 221, the angular velocity sensor 222, the acceleration sensor 223, the steering angle sensor 224, the GNSS reception unit 225, the camera 226, a microphone 227, a speaker 228, and an air conditioning apparatus 229 via the bus line B and the input/output interface unit 220.

The control unit 211 performs satellite positioning based on GNSS positioning data, autonomous positioning based on speed data, angular velocity data, relative orientation data, acceleration data, steering angle data, or the like, or hybrid positioning by combining them, and acquires current location information indicating the current location (latitude, longitude, and altitude) of the own vehicle. In addition, the control unit 211 detects the movement direction of the own vehicle based on at least a part of the GNSS positioning data, the speed data, the angular velocity data, the relative orientation data, the acceleration data, and the steering angle data.

The camera 227 generates an image by shooting the outside of the own vehicle. Specifically, the camera (left) 227L shoots a view on the left side as viewed from the own vehicle as shown in FIG. 3. In addition, the camera (right) 227R (not illustrated in FIG. 3) shoots a view on the right side as viewed from the own vehicle. The image generated by the camera 227 is stored in the storage unit 212. Note that the camera 227 performs shooting both when the own vehicle is stopped and when the own vehicle is in motion so that the passenger can enjoy the view from the own vehicle by the image displayed on the display 226. That is, the camera 227 generates a plurality of continuous images by performing continuous shooting or performing shooting in a moving image format every time a predetermined time (e.g., 1 second) elapses. Due to this, the camera 227 shoots a view of the outside of the own vehicle from a different point when the own vehicle is in motion, and shoots a view of the outside of the own vehicle from the same point when the own vehicle is stopped.

The display 226 is installed inside the own vehicle in a side surface direction with reference to the movement direction of the own vehicle (the forward direction and the backward direction, which is an opposite direction of the forward direction), and displays an image generated by the camera 227. Specifically, as shown in FIG. 3, the display (upper left) 226LU is installed on a left side surface portion inside the own vehicle, and displays an image generated by the camera (left) 227L as shown in FIG. 4. Similarly, the display (upper right) 226RU (not illustrated in FIG. 3) is installed on a right side surface portion inside the own vehicle, and displays an image shot by the camera (right) 227R. Note that since the difference between the display (upper left) 226LU and the display (upper right) 226RU lies in whether to be installed on the left side or the right side of the vehicle, respectively, the display (upper left) 226LU installed on the left side will be explained regarding the similar parts, and the explanation on the display (upper right) 226RU installed on the right side is sometimes omitted.

The control unit 211 performs an image switching control of causing the display (upper left) 226LU to display a plurality of continuous images generated by the camera (left) 227L while switching the images in order of shooting (shooting order). Note that for a plurality of continuous images shot in a moving image format, the control unit 211 performs a switching control of the images so that the shooting time and the reproduction time of the moving image match. Due to this, even if no window is installed on the left side surface portion and the right side surface portion of the own vehicle, the passenger can enjoy the view by the display 226 displaying the image shot by the camera 227. In addition, the passenger can also enjoy back the view shot in the past, i.e., the view from the point through which the own vehicle has passed. Furthermore, since a plurality of continuous images obtained by shooting the outside of the own vehicle are displayed while being switched, it is possible to obtain realistic sensations as if the passenger actually sees the view through the window. Note that a view in which the view changes is displayed by performing the switching control of a plurality of continuous images shot while the own vehicle is in motion, and a view outside the own vehicle being stopped is displayed by performing the switching control of a plurality of continuous images shot while the own vehicle is stopped.

On the other hand, the display (lower left) 226LL is installed below the display (upper left) 226LU on the left side surface portion inside the own vehicle as shown in FIG. 3, and displays a reproduction scroll bar corresponding to the image displayed on the display (upper left) 226LU as shown in FIGS. 5 to 8. In addition, the display (lower right) 226RL (not illustrated in FIG. 3) is installed below the display (upper right) 226RU on the right side surface portion inside the own vehicle, and displays a reproduction scroll bar for the image displayed on the display (upper right) 226RU. Note that the display (lower left) 226LL and the display (lower right) 226RL that display the reproduction scroll bar are touchscreen displays, detect a touch on the display by the passenger (operator), and transmit a detection signal to the control unit 211. Due to this, the control unit 211 can detect that the display (lower left) 226LL and the display (lower right) 226RL have been touched by the operator and which display area the operator has touched. Note that since the difference between the display (lower left) 226LL and the display (lower right) 226RL lies in whether to be installed on the left side or the right side of the vehicle, respectively, the display (lower left) 226LL installed on the left side will be explained regarding the similar parts, and the explanation on the display (lower right) 226RL installed on the right side is sometimes omitted.

Figure 5:
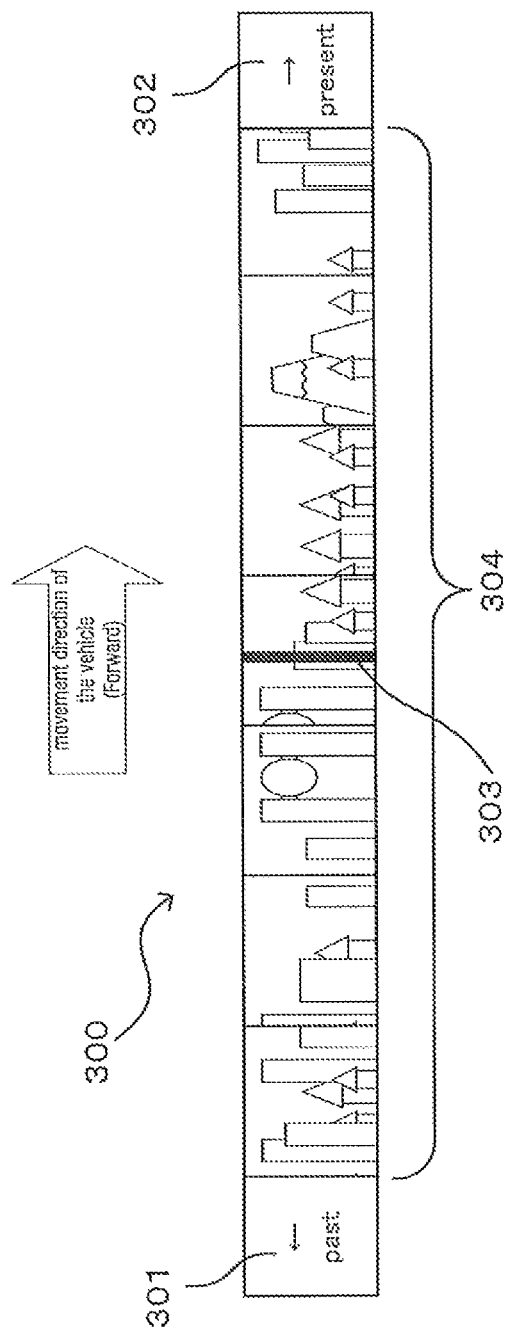
FIG. 5 is a view showing a display example of a reproduction scroll bar in the first example.
Figure 6:
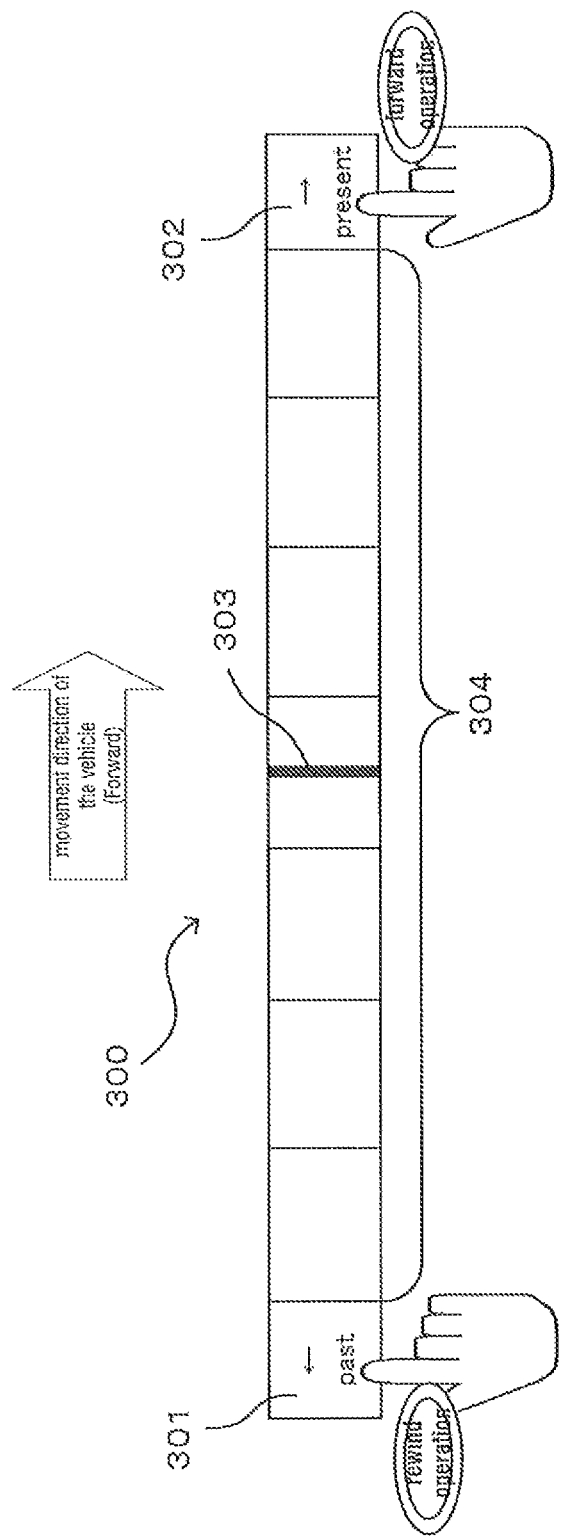
FIG. 6 is a view showing a display example of the reproduction scroll bar in the first example.
Figure 7:
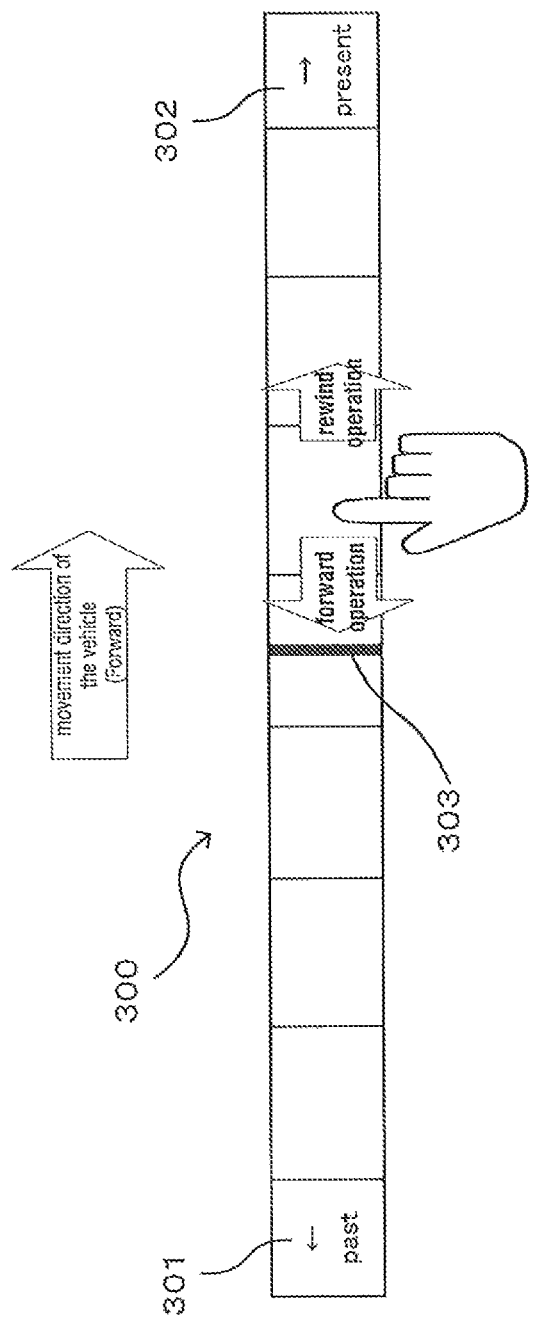
FIG. 7 is a view showing a display example of the reproduction scroll bar in the first example.
Figure 8:
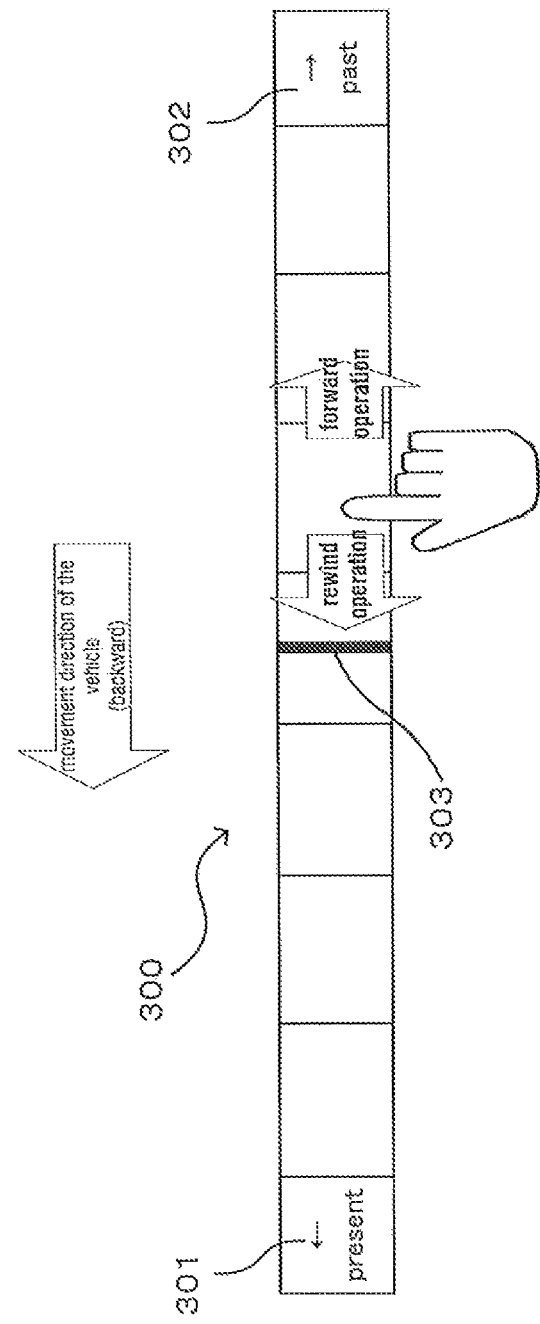
FIG. 8 is a view showing a display example of the reproduction scroll bar in the first example.

Next, the reproduction scroll bar displayed on the display (lower left) 226LL will be described with reference to FIGS. 5 to 8. FIG. 5 is a view showing a display example of a reproduction scroll bar 300 corresponding to the image being displayed on the display (upper left) 226LU shown in FIG. 4. FIGS. 6 and 7 are views showing display examples of the reproduction scroll bar 300 when the movement direction of the own vehicle is the forward direction, and FIG. 8 is a view showing a display example of the reproduction scroll bar 300 when the movement direction of the own vehicle is the backward direction. Note that in FIGS. 6 to 8, depiction of the thumbnail image in a thumbnail image section of the reproduction scroll bar is omitted.

The reproduction scroll bar 300 includes a first button section 301, a second button section 302, a reference line 303, and a thumbnail section 304. The thumbnail section 304 displays a thumbnail image group including a plurality of thumbnail images arranged side by side in order of shooting. At this time, a thumbnail image corresponding to the image being displayed on the display (upper left) 226LU is displayed distinguishably from other thumbnail images. Specifically, the thumbnail image corresponding to the image being displayed on the display (upper left) 226LU is displayed at a position superimposed on the reference line 303 arranged at the center of the thumbnail section 304. That is, the thumbnail image displayed at the position superimposed on the reference line 303 is an image obtained by reducing the image being displayed on the display (upper left) 226LU.

The first button section 301 and the second button section 302 are provided with different indications from each other of either "past" or "present" in accordance with the movement direction of the own vehicle. That is, when the movement direction of the own vehicle is the forward direction, "past" is indicated in the first button section 301, and "present" is indicated in the second button section 302 as shown in FIG. 5. On the other hand, when the movement direction of the own vehicle is the backward direction (the opposite direction of the forward direction), "present" is indicated in the first button section 301, and "past" is indicated in the second button section 302 (see FIG. 8). Then, when having detected that the movement direction of the own vehicle has been switched, the control unit 211 switches the indications of "present" and "past" of the first button section 301 and the second button section 302. Note that hereinafter, the first button section 301 or the second button section 302 indicated as "past" is sometimes referred to as a "past button", and the first button section 301 or the second button section 302 indicated as "present" is sometimes referred to as a "present button".

As shown in FIG. 6, the first button section 301 (the past button in the example of FIG. 6) is a button that, upon a touch operation performed by the operator, scrolls leftward the thumbnail image group (slides rightward the thumbnail image group) displayed on the thumbnail section 304. In the example of FIG. 6, since the first button section 301 is the past button, the thumbnail image displayed being superimposed on the reference line 303 after the touch operation on the first button section 301 is a thumbnail image shot before the touch operation. Since the thumbnail image displayed being superimposed on the reference line 303 corresponds to the image displayed on the display (upper left) 226LU, the past button is a button for performing the "rewind operation" of setting the image being displayed on the display (upper left) 226LU to be an image shot before the image being displayed. On the other hand, the second button section 302 (the present button in the example of FIG. 6) is a button that, upon a touch operation performed by the operator, scrolls rightward the thumbnail image group (slides leftward the thumbnail image group) displayed on the thumbnail section 304. In the example of FIG. 6, since the second button section 302 is the present button, the thumbnail image displayed being superimposed on the reference line 303 after the touch operation on the second button section 302 is a thumbnail image shot after the touch operation. That is, the present button is a button for performing the "forward operation" of setting the image being displayed on the display (upper left) 226LU to be an image shot after the image being displayed.

As shown in FIGS. 7 and 8, the operator can perform the forward operation or the rewind operation of the image by sliding the thumbnail image group of the thumbnail section 304 (sliding right and left the thumbnail section 304 in a state of touching the thumbnail section 304 with a finger, a stylus, or the like). Specifically, as shown in FIG. 7, when the movement direction of the own vehicle is the forward direction (i.e., when the first button section 301 is the past button and the second button section 302 is the present button), the rewind operation can be performed by sliding rightward the thumbnail image group of the thumbnail section 304, and the forward operation can be performed by sliding leftward the thumbnail section 304. Furthermore, as shown in FIG. 8, when the movement direction of the own vehicle is the backward direction (i.e., when the first button section 301 is the present button and the second button section 302 is the past button), the forward operation can be performed by sliding rightward the thumbnail section 304, and the rewind operation can be performed by sliding leftward the thumbnail section 304. That is, when having detected that the movement direction of the own vehicle has been switched, the control unit 211 switches, for example, the operation of sliding rightward (rightward slide operation) the thumbnail portion 304 of the reproduction scroll bar 300 from the rewind operation to the forward operation, or the forward operation to the rewind operation, or switches the operation of sliding leftward (leftward slide operation) the thumbnail section 304 from the forward operation to the rewind operation, or the rewind operation to the forward operation. Thus, the direction of sliding for performing the forward operation or the rewind operation is switched depending on the movement direction of the vehicle. In the present example, since the direction of sliding is switched such that the direction in which the view seen from the own vehicle flows by the movement of the own vehicle (the direction opposite to the movement direction of the own vehicle) coincides with the direction of sliding by the forward operation (the left direction in the example of FIG. 7, and the right direction in the example of FIG. 8), the operator can perform the forward operation and the rewind operation free from a feeling of strangeness. Note that in the present example, a scrolling operation involving a touch on the thumbnail section 304 is defined as the forward operation or the rewind operation, but another operation involving no touch on the reproduction scroll bar 300 can be a forward operation or a rewind operation. For example, an operation of moving a hand, a foot, a head, a line of sight, or the like along the movement direction of the vehicle may be detected, and when the movement direction of the vehicle is the forward direction, an operation of moving from the front to rear may be detected as the forward operation, and an operation of moving from the rear to front may be detected as the rewind operation.

The control unit 211 updates the thumbnail section 304 of the reproduction scroll bar in accordance with the switching of the image displayed on the display (upper left) 226LU. That is, in accordance with the switching of the image displayed on the display (upper left) 226LU, the control unit 211 slides leftward the thumbnail image group (when the movement direction of the vehicle is the forward direction. The control unit 211 slides rightward the thumbnail image group when the movement direction of the vehicle is the backward direction), and updates the thumbnail section 304 so that the thumbnail image corresponding to the image being displayed on the display (upper left) 226LU is displayed at a position superimposed on the reference line 303. That is, the control unit 211 performs concurrently the image switching control and update of the thumbnail section 304 such that the thumbnail image of the image being displayed on the display (upper left) 226LU is constantly superimposed on the reference line 303. Note that when the switching control is performed on the plurality of continuous images shot while the own vehicle is stopped, a state in which the view does not change for the length of time during which the vehicle is stopped (the view seen from the own vehicle being stopped) is displayed on the display (upper left) 226LU, and on the other hand, in the thumbnail section 304, a thumbnail image group including thumbnail images respectively corresponding to the plurality of continuous images shot while the own vehicle is stopped (images obtained by shooting the same view) is updated so as to slide leftward.

Note that display examples of the display (upper left) 226LU and the display (lower left) 226LL installed on the left side of the vehicle have been described in FIGS. 4 to 8, but regarding the display (upper right) 226RU and the display (lower right) 226RL installed on the right side of the vehicle, the positions of the present button and the past button, and the scroll (slide) direction corresponding to the forward operation or the rewind operation are determined in accordance with the movement direction of the own vehicle similarly to the left side. That is, the present button is provided on the movement direction side of the own vehicle, and the past button is provided on the side of the direction opposite to the movement direction. In addition, the operation of sliding thumbnail section 304 in the movement direction of the own vehicle becomes the rewind operation, and the operation of sliding the thumbnail section 304 in the direction opposite to the movement direction becomes the forward operation.

1.2. Display Control Processing by Control Unit 211

Figure 9:
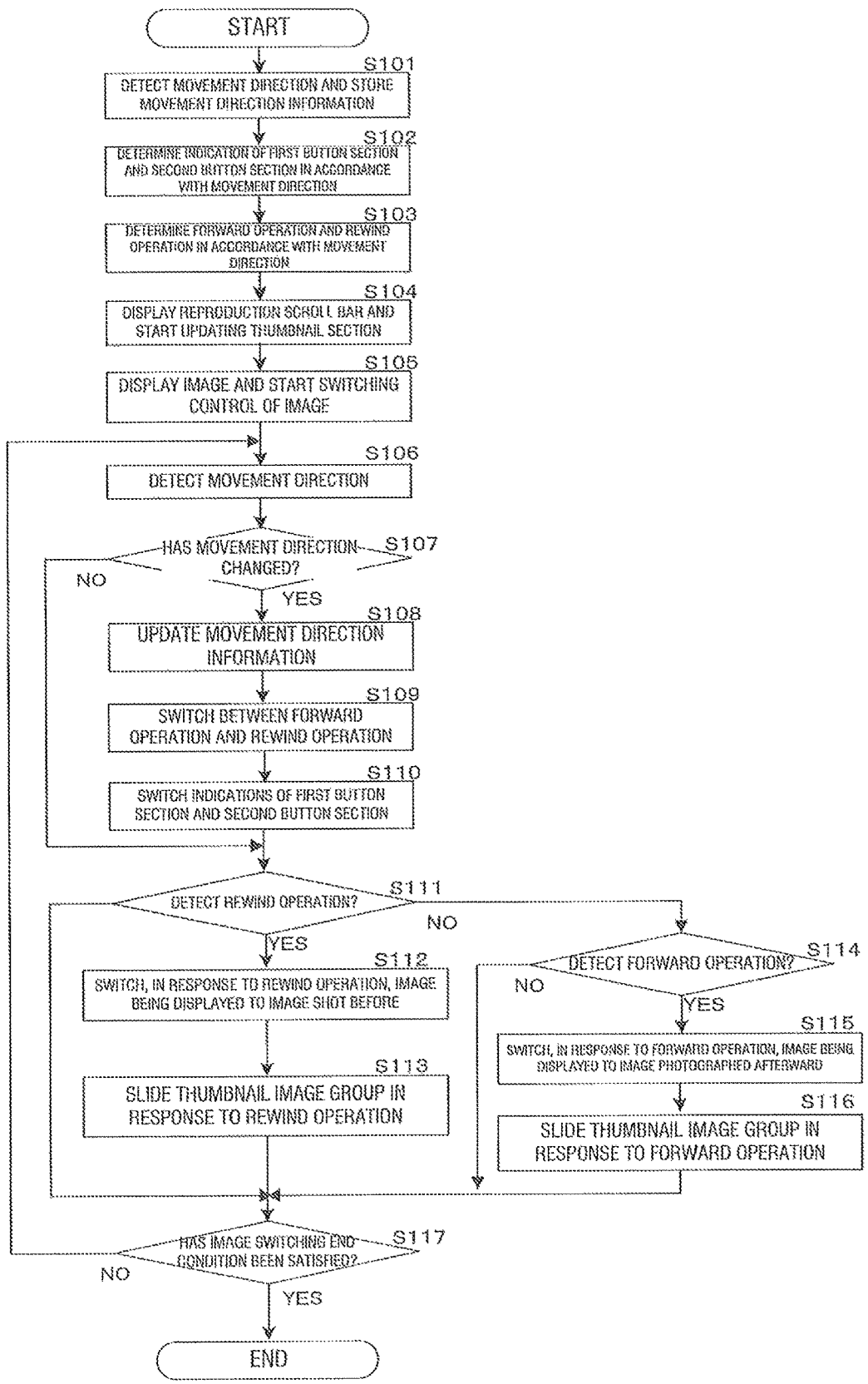
FIG. 9 is a flowchart showing an example of display control processing by a control unit 211 in the first example.

Next, the display control processing by the control unit 211 will be described with reference to the flowchart shown in FIG. 9. Note that FIG. 9 is a flowchart showing an example of the display control processing by the control unit 211. The display control processing is executed when a condition for displaying an image on the display 226 is satisfied. Note that the display control processing related to the display (upper left) 226LU and the display (lower left) 226LL will be described here.

First, the control unit 211 detects the movement direction of the own vehicle and stores movement direction information indicating the movement direction in the storage unit 212 (step S101). Note that in the present example, the movement direction information is information indicating as to which of the forward direction and the backward direction the own vehicle moves in.

Next, the control unit 211 determines the indications of the first button section 301 and the second button section 302 in accordance with the movement direction detected by the processing of step S101 (step S102). Specifically, when the movement direction is the forward direction, the control unit 211 determines to indicate "past" in the first button section 301 and indicate "present" in the second button section 302. Due to this, in the processing of step S104 of displaying the reproduction scroll bar, "past" is indicated in the first button section 301, and "past" is indicated in the second button section 302.

Next, the control unit 211 determines the forward operation and the rewind operation in accordance with the movement direction detected in the processing of step S101 (step S103). Specifically, when the movement direction is the forward direction, the control unit 211 determines the operation of sliding rightward the thumbnail image group of the thumbnail section 304 as the rewind operation, and determines the operation of sliding rightward the thumbnail section 304 as the forward operation. In addition, when the movement direction is the forward direction, the control unit 211 determines the operation of touching the first button section 301 as the rewind operation, and determines the operation of touching the second button section 302 as the forward operation.

Next, the control unit 211 displays the reproduction scroll bar 300 on the display (lower left) 226LL, and starts updating the thumbnail section 304 (step S104). Note that in the first button section 301 and the second button section 302, "present" or "past" is indicated, respectively, based on the determination in the processing of step S102. In the thumbnail section 304, thumbnail images are arranged in shooting order (such that the thumbnail images are sorted by oldest to newest from the past button toward the present button). Furthermore, in the thumbnail section 304, first, a thumbnail image corresponding to an image (display start time image) displayed when the display of the image on the display (upper left) 226LU is started is displayed at a position superimposed on the reference line 303, and thereafter, the thumbnail section 304 is updated according to the switching control of the image displayed on the display (upper left) 226LU. The display start time image can be a discretionary image, and can be, for example, an image displayed when the display of the image is terminated last time, an image shot least recently, or the like.

Next, the control unit 211 displays the display start time image on the display (upper left) 226LU and starts image switching control (step S105). Note that in accordance with the image switching control, the control unit 211 updates the thumbnail section 304, and performs control so that the image displayed on the display (upper left) 226LU and the thumbnail image displayed being superimposed on the reference line 303 coincide with each other. That is, the image displayed on the display (upper left) 226LU and the thumbnail image displayed on the thumbnail section 304 are synchronized.

Next, the control unit 211 detects the movement direction of the own vehicle (step S106), and determines whether or not the movement direction has changed from when the movement direction was detected most recently (step S107). If having determined that the movement direction has not changed (step S107: NO), the control unit 211 proceeds to the processing of step S111. On the other hand, if having determined that the movement direction has changed (step S107: YES), the control unit 211 updates the movement direction information (step S108), and switches the forward operation and the rewind operation (step S109). For example, when the rightward slide operation is the rewind operation and the leftward slide operation is the forward operation, the control unit 211 sets the rightward slide operation as the forward operation and sets the leftward slide operation as the rewind operation. In addition, when the operation of touching the first button section 301 is the rewind operation and the operation of touching the second button section 302 is the forward operation, the control unit 211 sets the operation of touching the first button section 301 as the forward operation and the operation of touching the second button section 302 as the rewind operation.

Next, the control unit 211 switches (replaces) the indications of the first button section 301 with the second button section 302 (step S110). For example, when the indication of the first button section 301 is "past" and the indication of the second button section 302 is "present", the control unit 211 sets the indication of the first button section 301 as "present" and the indication of the second button section 302 as "past".

If having determined that the movement direction has not changed in the processing of step S107 (step S107: NO) or if having ended the processing of step S110, the control unit 211 then determines whether or not the rewind operation has been detected (step S111). If having determined that the rewind operation has been detected (step S111: YES), the control unit 211 switches, in response to the rewind operation, the image being displayed on the display (upper left) 226LU to an image shot before the image (step S112), and resumes the image switching control. Furthermore, the control unit 211 performs, in response to the rewind operation, a slide control of sliding the thumbnail image group displayed on the thumbnail section 304 (step S113), and resumes the update of the thumbnail section 304. Specifically, the control unit 211 slides rightward the thumbnail image group when "past" is indicated in the first button section 301, the control unit 211 slides leftward the thumbnail image group when "present" is indicated in the first button section 301. That is, even in a case where the rewind operation is performed, the control unit 211 synchronizes the image displayed on the display (upper left) 226LU with the thumbnail image displayed being superimposed on the reference line 303 of the thumbnail section 304.

On the other hand, if having determined that the rewind operation has not been detected (step S111: NO), the control unit 211 then determines whether or not the forward operation has been detected (step S114). If having determined that the forward operation has not been detected (step S114: NO), the control unit 211 proceeds to the processing of step S117. On the other hand, if having determined that the forward operation has been detected (step S114: YES), the control unit 211 switches, in response to the forward operation, the image being displayed on the display (upper left) 226LU to an image shot after the image (step S115), and resumes the image switching control. Furthermore, the control unit 211 performs, in response to the forward operation, a slide control of sliding the thumbnail image group displayed in thumbnail section 304 (step S116), and resumes the update of the thumbnail section 304. Specifically, the control unit 211 slides leftward the thumbnail image group when "past" is indicated in the first button section 301, the control unit 211 slides rightward the thumbnail image group when "present" is indicated in the first button section 301. That is, even in a case where the forward operation is performed, the control unit 211 synchronizes the image displayed on the display (upper left) 226LU with the thumbnail image displayed being superimposed on the reference line 303 of the thumbnail section 304.

Next, the control unit 211 determines whether or not an image switching end condition has been satisfied (step S117). A discretionary condition can be set as the image switching end condition. For example, it is possible to set that an operation of ending the image switching control is detected, that the display control device 200 is turned off, or the like. If having determined that the image switching end condition has not been satisfied (step S117: NO), the control unit 211 proceeds to the processing of step S106 and repeats the processing of steps S106 to S117. On the other hand, if having determined that the image switching end condition has been satisfied (step S117: YES), the control unit 211 ends the display control processing.

As described above, in the display control device 200 in the first example, the control unit 211 (example of "first display control means", "operation detection means", "movement direction detection means", and "switching means") displays an image obtained by shooting the outside of the vehicle (example of "moving body") in the vehicle, detects an operation (example of "first operation") of sliding leftward the thumbnail image group of the thumbnail section 304, detects the movement direction, which is a direction in which the vehicle moves, switches, in accordance with the movement direction, the operation of sliding leftward between to be the forward operation of displaying an image shot after the image being displayed and to be the rewind operation of displaying an image shot before the image being displayed, and displays an image in accordance with the forward operation or the rewind operation.

Similarly, the control unit 211 of the display control device 200 in the first example switches, in accordance with the movement direction, the operation of touching the second button section 302 between to be a forward operation of displaying an image shot after the image being displayed and to be a rewind operation of displaying an image shot before the image being displayed.

Therefore, according to the display control device 200 in the first example, in a case where an image obtained by shooting a view from the vehicle (example of "outside of the vehicle") is displayed in the vehicle, it is switched in accordance with the movement direction whether the operation of sliding leftward the thumbnail image group of the thumbnail section 304 or the operation of touching the second button section 302 is a forward operation of displaying an image shot after the image being displayed or a rewind operation of displaying an image shot before the image being displayed, and an image corresponding to the forward operation or the rewind operation is displayed. Therefore, since the forward operation and the rewind operation can be switched in accordance with the movement direction so that the operator can intuitively operate free from a feeling of strangeness, the operator can intuitively operate free from a feeling of strangeness the operation of displaying an image shot before or after the image being displayed.

In addition, in the display control device 200 in the first example, the image displayed in the vehicle is an image continuously shot from the vehicle. This makes it possible to show images continuously shot from the vehicle to the passenger of the vehicle. In particular, if the images are shot in a moving image format, it is possible to give a feeling as if directly seeing the view.

Furthermore, the control unit 211 of display control device 200 in the first example further detects an operation (example of "second operation") of sliding rightward the thumbnail image group of the thumbnail section 304 different from the operation of sliding leftward the thumbnail image group of the thumbnail section 304, sets the operation of sliding leftward the thumbnail image group as the forward operation and sets the operation of sliding rightward the thumbnail image group as the rewind operation when the movement direction is the forward direction (example of "first direction"), and switches the operation of sliding leftward the thumbnail image group as the rewind operation and switches the operation of sliding rightward the thumbnail image group as the forward operation when the movement direction is switched from the forward direction to the backward direction (example of "second direction").

Similarly, the control unit 211 of display control device 200 in the first example further detects an operation of touching the first button section 301 (example of "second operation") different from the operation of touching the second button section 302, sets the operation of touching the second button section 302 as the forward operation and sets the operation of touching the first button section 301 as the rewind operation when the movement direction is the forward direction (example of "first direction"), and switches the operation of touching the second button section 302 to the rewind operation and switches the operation of touching the first button section 301 to the forward operation when the movement direction is switched from the forward direction to the backward direction (example of "second direction").

Therefore, according to the display control device 200 in the first example, it is possible to intuitively perform the forward operation and the rewind operation free from a feeling of strangeness even if the movement direction is switched.

Furthermore, the display (lower left) 226LL (example of "operation detection means") and the control unit 211 of the display control device 200 in the first example detect an operation of touching the second button section 302 (example of "first detection unit") and an operation of touching the first button section 301 (example of "second detection unit"), indicates that the second button section 302 corresponds to the forward operation and the first button section 301 corresponds to the rewind operation (example of "presentation") if the movement direction of the own vehicle is the forward direction, and switches to the indication that the second button section 302 corresponds to the rewind operation and the first button section 301 corresponds to the forward operation if the movement direction is switched from the forward direction to the backward direction. This enables the operator to grasp that the parts to touch for the forward operation and the rewind operation has been switched.

Furthermore, the control unit 211 (example of "second display control means") of the display control device 200 in the first example displays a plurality of thumbnail images side by side in order of shooting on the display (lower left) 226LL, and superimposes, on the reference line 303, the thumbnail image corresponding to the image displayed on the display (upper left) 226LU among the thumbnail images displayed side by side, thereby displays the thumbnail image distinguishably from other thumbnail images. This causes the operator to easily search the thumbnail images for an image that the operator wants to display on the display (upper left) 226LU, and enables the operator to grasp which operation of the rewind operation or the forward operation to perform to display the image.

2. Second Example

Figure 10:
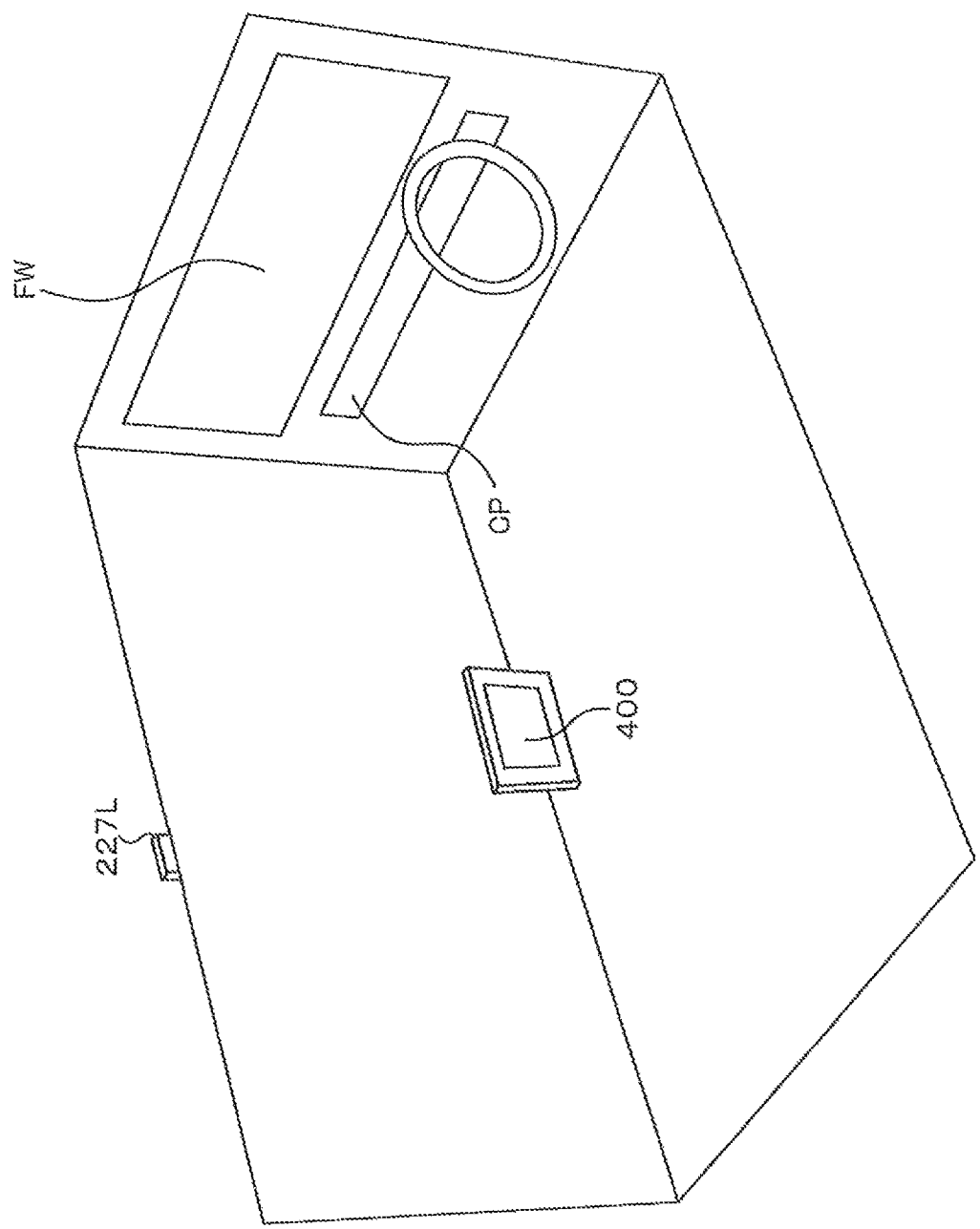
FIG. 10 is a schematic diagram showing a state of a vehicle (mainly inside thereof) equipped with the display control device 200 in a second example.
Figure 11:
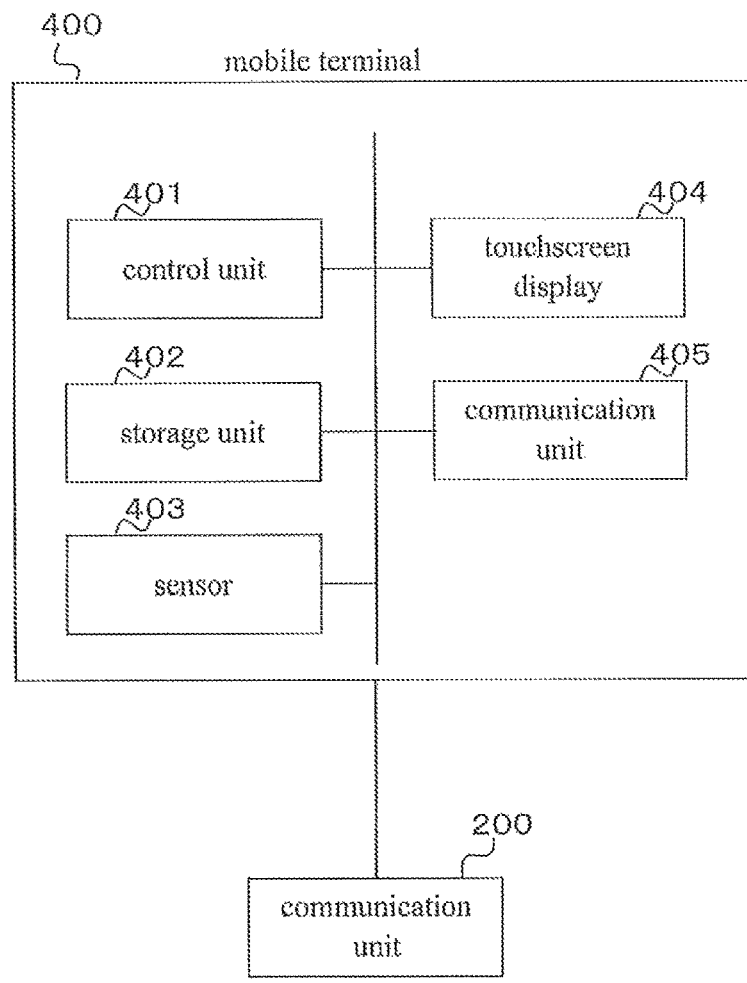
FIG. 11(A) is a block diagram showing a configuration example of a mobile terminal 400 in the second example.
FIG. 11(B) is a view showing an example of an image display area and a reproduction scroll bar display area on a display.
Figure 11:
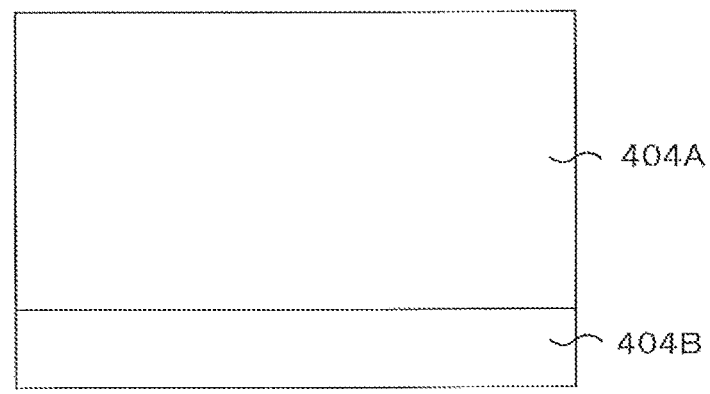
Figure 12:
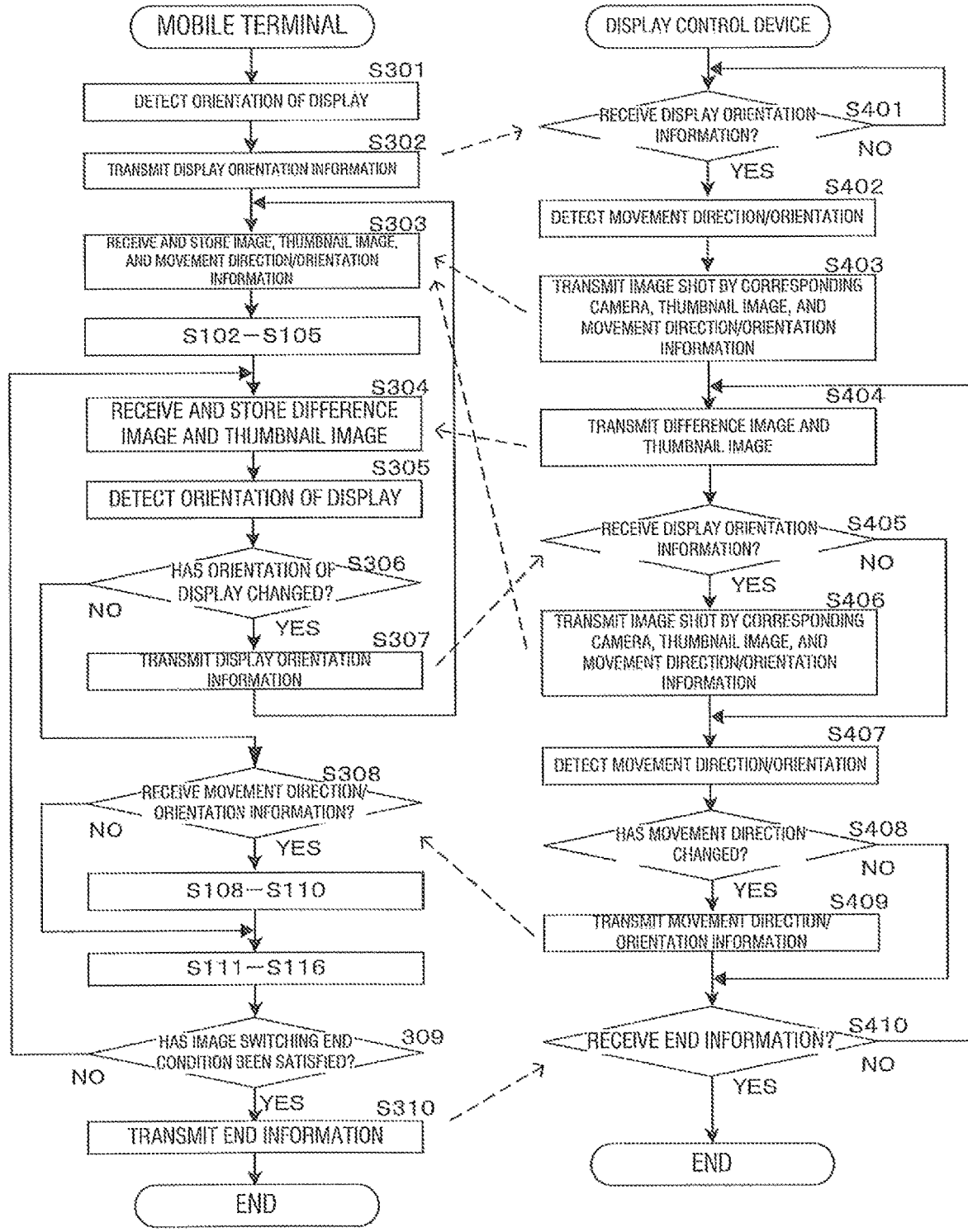
FIG. 12 is a flowchart showing an operation example of the display control device 200 and the mobile terminal 400 in the second example.

Next, the second example corresponding to the above-described embodiment will be described with reference to FIGS. 10 to 12. FIG. 10 is a schematic diagram showing an example of an own vehicle (mainly inside thereof) in the second example. FIG. 11(A) is a block diagram showing a configuration example of the mobile terminal 400, and FIG. 11(B) is a view showing an example of an image display area and a reproduction scroll bar display area on a display. FIG. 12 is a flowchart showing an operation example of the display control device 200 and the mobile terminal 400 in the second example. Note that hereinafter, differences from the first example will be mainly explained, and the same members and processing as those of the first example will be explained using the same reference numerals.

In the first example, an image shot by the camera 227 is displayed on the display 226 installed on the side surface portion of the own vehicle. However, in the second example, as shown in FIG. 10, an image shot by the camera 227 is displayed on a display of the mobile terminal 400 in the own vehicle in place of (or in addition to) the display 226. Note that in the first example, in the case of the left side surface portion for example, an image and the reproduction scroll bar 300 are displayed separately on the display 226 (upper left) LU and the display 226 (lower left) LL, but in the second example, an image and the reproduction scroll bar 300 are displayed on the display of the mobile terminal 400, separately in the image display area for displaying the image and the reproduction scroll bar display area.

2.1. Configuration of Mobile Terminal 400

As shown in FIG. 11, in the second example, the mobile terminal 400 is connected to the display control device 200 in a wireless or wired manner. The mobile terminal 400 is configured to roughly include a control unit 401, a storage unit 402, a sensor 403, a touchscreen display 404, and a communication unit 405.

The storage unit 402 includes, for example, a nonvolatile memory and stores an OS, various application programs, and various data.

The sensor 403 includes a plurality of sensors such as a GPS sensor, a magnetic sensor, an acceleration sensor, and a gyro sensor.

The touchscreen display 404 (hereinafter, sometimes referred to as a "display 404") includes, for example, a liquid crystal display and a touch sensor. In addition, when a display control application is activated, the display 404 displays, as shown in FIG. 11(B), its display area divided into an image display area 404A for displaying an image and a reproduction scroll bar display area 404B for displaying the reproduction scroll bar.

The communication unit 405 controls a communication state with the display control device 200, a mobile phone base station (not illustrated), or a server.

The control unit 401 includes a central processing unit (CPU), a read only memory (ROM), and a random access memory (RAM) or the like. Then, the CPU reads and executes various programs stored in the ROM or the storage unit 402, thereby implementing various functions.

Furthermore, the control unit 401 detects the orientation of the display 404 based on the sensor information received from the sensor 403. For example, the control unit 401 detects which direction the surface of the display 404 faces, and generates display orientation information indicating the orientation.

2.2. Display Control Processing by Mobile Terminal 400 and Display Control Device 200

Next, the display control processing by the mobile terminal 400 and the display control device 200 will be described with reference to the flowchart shown in FIG. 12. The display control processing shown in FIG. 12 is started when a condition for displaying an image on the display 404 in the mobile terminal 400 is satisfied and the mobile terminal 400 transmits, to the display control device 200, start information indicating that the display control processing is started.

First, the control unit 401 of the mobile terminal 400 detects the orientation of the display 404 based on the sensor information received from the sensor 403 (step S301). Next, the control unit 401 transmits, to the display control device 200, display orientation information indicating the orientation of the display 404 detected in the processing of step S301 (step S302).

On the other hand, the control unit 211 of the display control device 200 waits until receiving display orientation information from the mobile terminal 400 (step S401: NO). Upon receiving the display orientation information (step S401: YES), the control unit 211 detects the movement direction (either the forward direction or the backward direction) of the own vehicle and the movement orientation (step S402), and stores, in the storage unit 212, movement direction/orientation information inclusive of the information indicating these.

Next, the control unit 211 transmits, to the mobile terminal 400, a plurality of continuous images shot by the camera 227 corresponding to the orientation of the display 404, thumbnail images thereof, and movement direction/orientation information (step S403). For example, when the display orientation information indicates the east orientation, the control unit 211 transmits a plurality of continuous images shot by the camera 227 facing the west side (back side of the mobile terminal 400) of the own vehicle (e.g., the camera (left) 227L when the windshield FW of the own vehicle faces north). Note that the image transmitted here is an image shot between the start of shooting and the reception of the display orientation information.

Upon receiving the image, the thumbnail image, and the movement direction/orientation information from the display control device 200, the control unit 401 of the mobile terminal 400 stores them in the storage unit 402 (step S303).

Next, the control unit 401 performs processing similar to the processing of steps S102 to S105 by the control unit 211 of the display control device 200 in the first example. That is, the indications of the first button section 301 and the second button section 302 are determined in accordance with the movement orientation indicated by the movement direction/orientation information stored in the processing of step S303 and the display direction detected in the processing of step S301 (step S102). For example, when the movement orientation is north and the orientation of the display 404 is east orientation, the control unit 401 determines to indicate "past" in the first button section 301 and indicate "present" in the second button section 302. Due to this, when the reproduction scroll bar 300 is displayed, "past" is indicated in the first button section 301, and "past" is indicated in the second button section 302.

Next, the control unit 401 determines the forward operation and the rewind operation in accordance with the movement orientation and the orientation of the display 404 (step S103). For example, when the movement orientation is north and the orientation of the display 404 is east, the control unit 401 determines the operation of sliding rightward the thumbnail image group of the thumbnail section 304 as the rewind operation, and determines the operation of sliding leftward the thumbnail image group as the forward operation. In addition, when the movement orientation is north and the orientation of the display 404 is east, the control unit 401 determines the operation of touching the first button section 301 as the rewind operation, and determines the operation of touching the second button section 302 as the forward operation.

Next, the control unit 401 displays the reproduction scroll bar 300 in the reproduction scroll bar display area 404B of the display 404, and starts updating the thumbnail section 304 (step S104). In the thumbnail section 304, thumbnail images are arranged in shooting order (such that the thumbnail images are sorted by oldest to newest from the past button toward the present button). Furthermore, in the thumbnail section 304, first, a thumbnail image corresponding to an image (display start time image) displayed when the display of the image on the image display area 404A of the display 404 is started is displayed at a position superimposed on the reference line 303, and thereafter, the thumbnail section 304 is updated according to the switching control of the image displayed on the image display area 404A. The display start time image can be a discretionary image, and can be, for example, an image displayed when the display of the image is terminated last time, an image shot least recently, or the like.

Next, the control unit 401 displays the display start time image in the image display area 404A of the display 404 and starts image switching control (step S105). Note that in accordance with the image switching control, the control unit 211 updates the thumbnail section 304, and performs control so that the image displayed in the image display area 404A of the display 404 and the thumbnail image displayed being superimposed on the reference line 303 coincide with each other. That is, the image displayed in the image display area 404A of the display 404 and the thumbnail image displayed on the thumbnail section 304 are synchronized.

On the other hand, after the processing of step 403 or if having determined "NO" in the processing of step S410 described later, the control unit 211 of the display control device 200 transmits a difference image and the thumbnail image to the mobile terminal 400 (step S404). In a case where the image shooting by the camera 227 is continued even after the image and the thumbnail image are transmitted in the processing of step S403, the display control device 200 transmits, in the processing of step S404, the image shot after the processing of step S403 and the thumbnail image of the image.

Upon receiving the difference image and the thumbnail image from the display control device 200, the control unit 401 of the mobile terminal 400 stores them in the storage unit 402 (step S304). Next, the control unit 401 detects the orientation of the display 404 based on the sensor information received from the sensor 403 (step S305), and determines whether or not the orientation has changed from when the orientation of the display 404 was detected most recently (step S306). For example, the control unit 401 determines whether the movement orientation of the own vehicle is north and the orientation of the display 404 has changed from the east orientation to the west orientation or from the west orientation to the east orientation. If having determined that the orientation of the display 404 has changed (step S306: YES), the control unit 401 transmits, to the display control device 200, display orientation information indicating the orientation of the display 404 detected in the processing of step S305 (step S307), and proceeds to the processing of step S303.

On the other hand, the control unit 211 of the display control device 200 determines, after the processing of step S404, whether or not the display orientation information has been received from the mobile terminal 400 (step S405). If having determined that the display orientation information has not been received (step S405: NO), the control unit 211 proceeds to the processing of step S407. On the other hand, if having determined that the display orientation information has been received (step S405: YES), similarly to the processing of step S403, the control unit 211 transmits, to the mobile terminal 400, the image shot by the camera 227 corresponding to the orientation of the display 404, the thumbnail image, and the movement direction/orientation information (step S406), and proceeds to the processing of step S407.

Next, the control unit 211 detects the movement direction (either the forward direction or the backward direction) of the own vehicle and the movement orientation (step S407), and stores, in the storage unit 212, movement direction/orientation information inclusive of the information indicating these. Next, the control unit 211 determines whether or not the movement direction has changed (step S408). If having determined that the movement direction has not changed (step S408: NO), the control unit 211 proceeds to the processing of step S410. On the other hand, if having determined that the movement direction has changed (step S408: YES), the control unit 211 transmits the movement direction/orientation information to the mobile terminal 400 (step S409), and proceeds to the processing of step S410.

On the other hand, if having determined that the orientation of the display 404 has not changed in the processing of step S306 (step S306: NO), the control unit 401 of the mobile terminal 400 then determines whether or not the movement direction/orientation information has been received from the display control device 200 (step S308).

If having determined that the movement direction/orientation information has been received (i.e., the movement direction of the own vehicle has changed) (step 308: YES), the control unit 401 performs processing similar to the processing of steps S108 to S110 by the control unit 211 of the display control device 200 in the first example. That is, the control unit 401 updates the movement direction/orientation information (step S108), and switches the forward operation and the rewind operation (step S109). For example, when the rightward slide operation is the rewind operation and the leftward slide operation is the forward operation, the control unit 401 sets the rightward slide operation as the forward operation and sets the leftward slide operation as the rewind operation. In addition, when the operation of touching the first button section 301 is the rewind operation and the operation of touching the second button section 302 is the forward operation, the control unit 401 sets the operation of touching the first button section 301 as the forward operation and the operation of touching the second button section 302 as the rewind operation. Next, the control unit 401 switches (replaces) the indications of the first button section 301 with the second button section 302 (step S110). For example, when the indication of the first button section 301 is "past" and the indication of the second button section 302 is "present", the control unit 211 sets the indication of the first button section 301 as "present" and the indication of the second button section 302 as "past".

After performing the processing similar to step S110 in the first example, or if having determined that the movement direction/orientation information has not been received (i.e., the movement direction of the own vehicle has not changed) in the processing of step 308 (step 308: NO), the control unit 401 then performs processing similar to the processing of steps S111 to S116 by the control unit 211 of the display control device 200 in the first example.

That is, the control unit 401 determines whether or not the rewind operation has been detected (step S111). If having determined that the rewind operation has been detected (step S111: YES), the control unit 401 switches, in response to the rewind operation, the image being displayed in the image display area 404A to an image shot before the image (step S112), and resumes the image switching control. Furthermore, the control unit 401 performs, in response to the rewind operation, a slide control of sliding the thumbnail image group displayed on the thumbnail section 304 (step S113), and resumes the update of the thumbnail section 304. Specifically, the control unit 211 slides rightward the thumbnail image group when "past" is indicated in the first button section 301, the control unit 211 slides leftward the thumbnail image group when "present" is indicated in the first button section 301. That is, even in a case where the rewind operation is performed, the control unit 211 synchronizes the image displayed in the image display area 404A with the thumbnail image displayed being superimposed on the reference line 303 of the thumbnail section 304.

On the other hand, if having determined that the rewind operation has not been detected (step S111: NO), the control unit 401 then determines whether or not the forward operation has been detected (step S114). If having determined that the forward operation has not been detected (step S114: NO), the control unit 401 proceeds to the processing of step S309. On the other hand, if having determined that the forward operation has been detected (step S114: YES), the control unit 401 switches, in response to the forward operation, the image being displayed in the image display area 404A to an image shot after the image (step S115), and resumes the image switching control. Furthermore, the control unit 401 performs, in response to the forward operation, a slide control of sliding the thumbnail image group displayed in thumbnail section 304 (step S116), and resumes the update of the thumbnail section 304. Specifically, the control unit 211 slides leftward the thumbnail image group when "past" is indicated in the first button section 301, the control unit 211 slides rightward the thumbnail image group when "present" is indicated in the first button section 301. That is, even in a case where the forward operation is performed, the control unit 211 synchronizes the image displayed in the image display area 404A with the thumbnail image displayed being superimposed on the reference line 303 of the thumbnail section 304. After the processing of step S116, the control unit 401 proceeds to the processing of step S309.

Next, the control unit 401 determines whether or not an image switching end condition has been satisfied (step S309). A discretionary condition can be set as the image switching end condition. For example, it is possible to set that an operation of ending the image switching control is detected, that the display control device 200 or the mobile terminal 400 is turned off, or the like. If having determined that the image switching end condition has not been satisfied (step S309: NO), the control unit 401 proceeds to the processing of step S304 and repeats the processing of steps S304 to S309. On the other hand, if having determined that the image switching end condition has been satisfied (step S309: YES), the control unit 401 transmits end information to the display control device 200 (step S310), and ends the processing shown in the flowchart.

On the other hand, after the processing of step S409, the control unit 211 of the display control device 200 determines whether or not the end information has been received from the mobile terminal 400 (step S410). If having determined that the end information has not been received (step S410: NO), the control unit 211 proceeds to the processing of step S404. On the other hand, if having determined that the end information has been received (step S410: YES), the control unit 211 ends the processing shown in the flowchart.

3. Variations

Next, variations of the present example will be described. Note that the variations described below can be appropriately combined.

3.1. Variation 1

In the first example, the roles are assigned separately to the display that displays an image such as the display (upper left) 226LU and the display that displays the reproduction scroll bar 300 such as the display (lower left) 226LL. However, these roles may be performed by a single touch-screen display. Specifically, an image display area for displaying an image and a reproduction scroll bar display area for displaying a reproduction scroll bar are included as in the display 404 of the mobile terminal 400 in the second example. This can reduce the number of displays by half.

3.2. Variation 2

3.2.1. Variation 2-1

Figure 13:
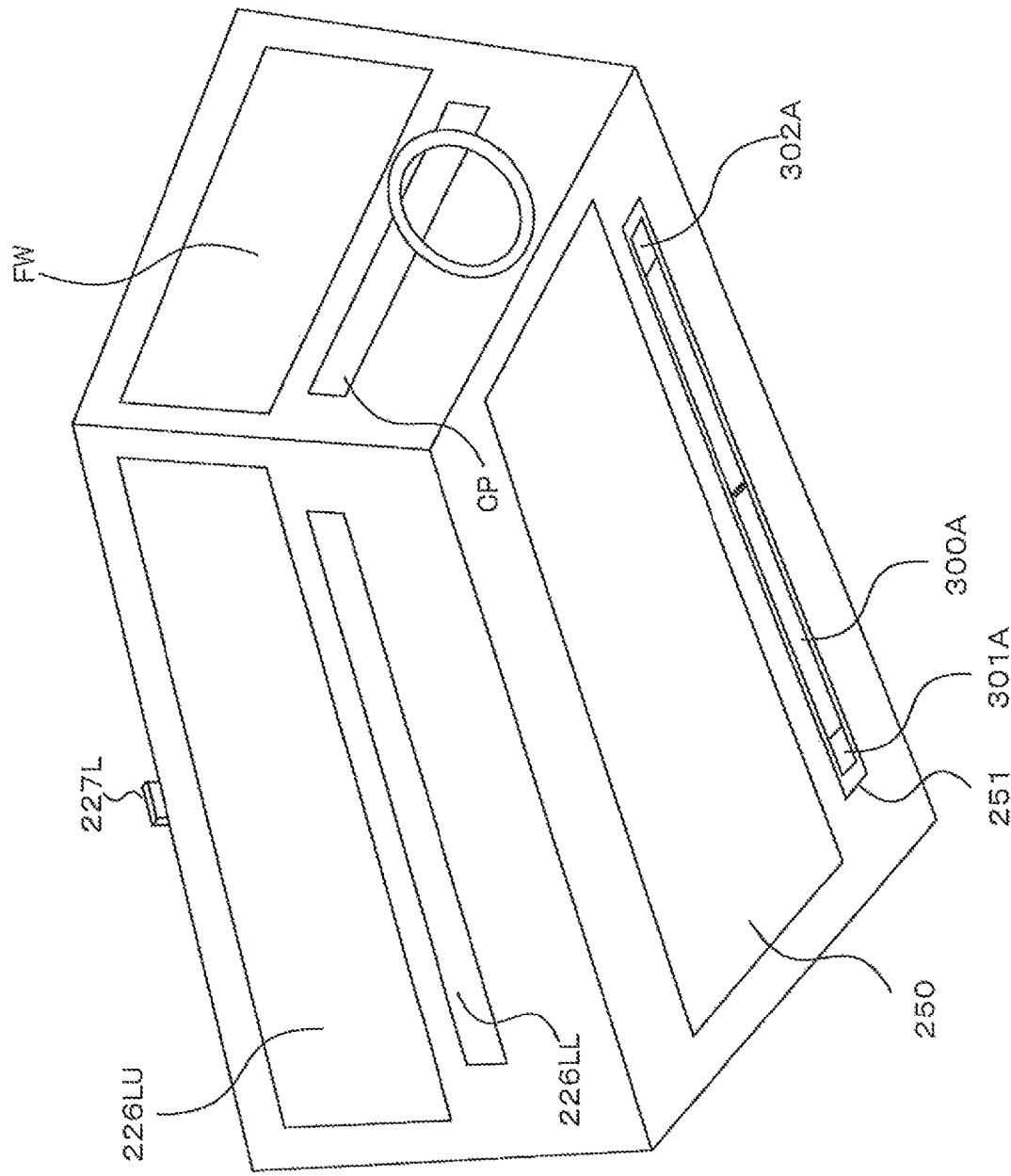
FIG. 13 is a schematic diagram showing an example of a vehicle (mainly inside thereof) equipped with the display control device 200 in the variation 2-1.

In the first example, the display (upper left) 226LU and the display (upper right) 226RU that display an image on the left and right side surface portions of the own vehicle (side surface portions with reference to the movement direction (forward direction) of the own vehicle) and the display (lower left) 226LL and the display (lower right) 226RL that display the reproduction scroll bar 300 are installed, and the camera 227 (right) R and the camera 227 (left) L that shoot left and right views as viewed from the own vehicle are installed. However, as shown in FIG. 13, a display 250 that displays an image on a floor portion in the own vehicle (floor portion with reference to the movement direction (forward direction) of the own vehicle) and a display 251 that displays a reproduction scroll bar 300A may be installed, and the camera 227 (not illustrated) that shoots a ground direction as viewed from the own vehicle may be installed and shot. The control unit 211 may display, on the display 250, an image shot by the camera 227 that shoots the ground direction, and may display, on the display 251, the reproduction scroll bar 300A corresponding thereto. In addition, although not illustrated, an image display that displays an image on a ceiling portion in the own vehicle (ceiling portion with reference to the movement direction (forward direction) of the own vehicle) and a reproduction scroll bar display that displays the reproduction scroll bar 300 may be installed, and the camera 227 that shoots an upper side as viewed from the own vehicle may be installed. The control unit 211 may display, on the image display installed on the ceiling portion, an image shot by the camera 227 that shoots information of the own vehicle, and may display the corresponding reproduction scroll bar 300 on the reproduction scroll bar display installed on the ceiling portion.

When displaying the reproduction scroll bar 300A on the display 251, the control unit 211 switches the indications of "present" and "past" of the first button 301A and the second button section 302A depending on the movement direction of the own vehicle. For example, the control unit 211 switches the indication of the first button 301A to "past" and the indication of the second button 302A to "present" when the movement direction of the own vehicle is the forward direction, and switches the indication of the first button 301A to "present" and the indication of the second button 302A to "past" when the movement direction of the own vehicle is switched from the forward direction to the backward direction. Note that the same is true for a case where the image display and the reproduction scroll bar display are installed on the ceiling portion.

3.2.2. Variation 2-2

In addition, a display that displays an image and a display that displays the reproduction scroll bar 300 may be installed on the front surface portion and the rear surface portion in the own vehicle, and the camera 227 that shoots the front side as viewed from the own vehicle or the camera 227 that shoots the rear side as viewed from the own vehicle may be installed. For example, as shown in FIG. 14, in a case of installing the display 260 that displays an image on the front surface portion of the own vehicle and the touchscreen display 261 that displays the reproduction scroll bar 300B, when the reproduction scroll bar 300B is displayed on the touchscreen display 261, the control unit 211 switches the indications of "present" and "past" of the first button 301B and the second button section 302B depending on the movement direction of the vehicle. For example, the control unit 211 switches the indication of the first button 301B to "past" and the indication of the second button 302B to "present" when the movement direction of the own vehicle is the forward direction, and switches the indication of the first button 301B to "present" and the indication of the second button 302B to "past" when the movement direction of the own vehicle is switched from the forward direction to the backward direction. However, the indications of "present" and "past" may be reversible by setting. For example, the control unit 211 switches the indication of the first button 301B to "present" and the indication of the second button 302B to "past" when the movement direction of the own vehicle is the forward direction, and switches the indication of the first button 301B to "past" and the indication of the second button 302B to "present" when the movement direction of the own vehicle is switched from the forward direction to the backward direction. This is because, in a case where the reproduction scroll bar 300B is vertically displayed on the traveling direction side of the vehicle as shown in FIG. 14, some people do not have a feeling of strangeness when "present" is indicated in the first button 301B, and some people do not have a feeling of strangeness when "past" is indicated in the first button 301B. In addition, the way of having a feeling of strangeness varies depending on the inclination (i.e., whether the upper portion of the front surface portion inclines to the front side and the lower portion inclines to the back side, or vice versa), shape, and size of the front surface portion, or the position in the height direction and the lateral direction in which the display 260 and the touchscreen display 261 are installed. Hence, the indications of "present" and "past" may be set in consideration of these. Note that while the case where the display 260 and the touchscreen display 261 are installed on the front surface portion has been described here, the same is true for a case where a display that displays an image and a display that displays the reproduction scroll bar 300B are installed on the rear surface portion. Note that in the case where the reproduction scroll bar is displayed on the front surface portion or the rear surface portion of the own vehicle, the display format in the case where the vehicle moves in the forward direction or the backward direction may be selectable to the operator from among the following display formats (1) to (4).

(1) The display format in which the reproduction scroll bar 300B is vertically displayed as shown in FIG. 14, and "present" is indicated in the first button 301B and "past" is indicated in the second button 302B.

(2) The display format in which the reproduction scroll bar 300B is vertically displayed as shown in FIG. 14, and "past" is indicated in the first button 301B and "present" is indicated in the second button 302B.

(3) The display format in which the reproduction scroll bar 300 is horizontally displayed as shown in FIG. 5, and "past" is indicated in the first button 301 and "present" is indicated in the second button 302.

(4) The display format in which the reproduction scroll bar 300 is horizontally displayed as shown in FIG. 5, and "present" is indicated in the first button 301 and "past" is indicated in the second button 302.

3.2.3. Variation 2-3

Furthermore, as shown in FIG. 15, the touchscreen displays 271A, 271B, 271C, and 271D, described in the variation 2, may be installed on front, rear, left, and right side surface portions in the vehicle 270 that can move without changing directions to the front, rear, left side, and right side of the vehicle 270, and cameras 272A, 272B, 272C, and 272D that shoot respective view of the front, rear, left side, and right side as viewed from the vehicle 270 may be installed. Then, the touchscreen display 271A displays an image shot by the camera 272A, the touchscreen display 271B displays an image shot by the camera 272B, the touchscreen display 271C displays an image shot by the camera 272C, and the touchscreen display 271D displays an image shot by the camera 272D. This enables the passenger to see the view on the front, rear, left side, and right side of the own vehicle even if the vehicle 270 includes no windows on the front, rear, left side, and right side. Note that a camera that shoots an upper side as viewed from the vehicle 270 may be installed and a touchscreen display may be installed on the ceiling portion of the vehicle 270 to display the image shot by the camera on the touchscreen display. Similarly, a camera that shoots a lower side (ground) as viewed from the vehicle 270 may be installed and a touchscreen display may be installed on the floor portion of the vehicle 270 to display the image shot by the camera on the touchscreen display.

Note that, in a case where the touchscreen displays 271A, 271B, 271C, and 271D are installed in the front, rear, left side, and right side of the vehicle 270, the display format of the image display area for displaying the image and the reproduction scroll bar display area for displaying the reproduction scroll bar may be switched depending on the movement direction of the vehicle 270. Here, the display format of the touchscreen displays 271A, 271B, 271C, and 271D in accordance with the movement direction of the vehicle 270 will be specifically described with reference to FIG. 16. The display area of the touchscreen displays 271A, 271B, 271C, and 271D is, as described in the variation 2, an image display area 275 for displaying an image and a reproduction scroll bar display area 276 for displaying a reproduction scroll bar. The reproduction scroll bar display area 276 is displayed vertically long or horizontally long in accordance with the orientation of the display on which the reproduction scroll bar is displayed and the movement direction of the vehicle 270. More specifically, on the touchscreen display 271A installed in the front of the vehicle 270 and the touchscreen display 271C installed in the rear of the vehicle 270, the reproduction scroll bar display area 276 is displayed vertically long on the right side of the image display area 275 when the movement direction of the vehicle 270 is forward or backward, and the reproduction scroll bar display area 276 is displayed horizontally long on the lower side of the image display area 275 when the movement direction of the vehicle 270 is left side or right side. In addition, on the touchscreen display 271B installed on the right side of the vehicle 270 and the touchscreen display 271D installed on the left side of the vehicle 270, the reproduction scroll bar display area 276 is displayed horizontally long on the lower side of the image display area 275 when the movement direction of the vehicle 270 is forward or backward, and the reproduction scroll bar display area 276 is displayed vertically long on the right side of the image display area 275 when the movement direction of the vehicle 270 is left side or right side. Note that when the reproduction scroll bar display area 276 is displayed vertically long, the reproduction scroll bar display area 276 may be displayed on the left side of the image display area 275. In addition, when the reproduction scroll bar display area 276 is displayed horizontally long, the reproduction scroll bar display area 276 may be displayed above the image display area 275.

3.3. Variation 3

The display control device 200 in the first example may display in real time an image shot by the camera 227 on the display (upper left) 226LU. That is, in a case where the forward operation is repeated until the latest image is displayed while the image shot by the camera (left) 227L is being displayed, the control unit 211 stores, in the storage unit 212, the image shot by the camera (left) 227L at that time, and immediately displays the image on the display (upper left) 226LU. This enables the passenger to see in real time, via the camera (left) 227L and the display (upper left) 226LU, the view seen from the own vehicle.

In addition, the display (upper left) 226LU may be a display having a switchable structure in which the rear side of the display is made transparent and visible or invisible, and the control unit 211 may switch to a state in which the rear side of the display is made transparent and visible in a case where an operation for displaying the latest image by the operator or an operation for seeing the view outside the vehicle at the current location is detected. Due to this, the passenger can see not a view displayed as an image but a live view.

3.4. Variation 4

In the first example, the display (lower left) 226LL and the display (lower right) 226RL that display the reproduction scroll bar 300 are installed on the side surface portion of the own vehicle. However, as shown in FIG. 17, a control tower 330 including displays 331L and 331R that display the reproduction scroll bar 300 may be installed in the center portion of the own vehicle. The display 331L displays the reproduction scroll bar 300 for performing a forward operation and a rewind operation for an image displayed on the display (upper left) 226LU, and the display 331R displays the reproduction scroll bar 300 for performing a forward operation and a rewind operation for an image displayed on the display (upper right) 226RU. The control of the reproduction scroll bar 300 displayed on the display 331L is similar to that of the reproduction scroll bar 300 displayed on the display (lower left) 226LL.

3.5. Variation 5

In the second example, the mobile terminal 400 and the display control device 200 perform processing in cooperation with each other in order to display the image and the reproduction scroll bar on the display 404 of the mobile terminal 400. However, the processing described as the processing by either one may be performed by the other. For example, the display control device 200 may transmit all the images shot by the camera (left) 227L and the camera (right) 227R to the mobile terminal 400 and store them in the storage unit 402, and the control unit 401 of the mobile terminal 400 may detect the movement direction and the movement orientation of the own vehicle, and based on the detection result and the orientation of the display 404, determine an image shot by which camera 227 is to be displayed on the display 404.

In addition, when detecting that the orientation of the display 404 has changed, the mobile terminal 400 may transmit the display orientation information to the display control device 200, and when detecting a forward operation or a rewind operation by the operator, the mobile terminal 400 may transmit, to the display control device 200, operation information indicating the content of the operation. The display control device 200 may transmit, to the mobile terminal 400, display data for displaying an image and the reproduction scroll bar on the display 404 of the mobile terminal 400 based on both the display orientation information and the operation information received from the mobile terminal 400. Then, the control unit 401 of the mobile terminal 400 may display the image and the reproduction scroll bar based on the display data received from the display control device 200.

3.6. Variation 6

In the first example and the second example, the image shot by the camera 227 installed in the own vehicle is displayed on the display 226 installed in the own vehicle. However, a view shot from a movement route of the own vehicle by a camera other than the camera 227 may be displayed on the display 226. For example, image data shot by a camera (camera that may be installed in another vehicle or owned by a passenger of another vehicle) other than the camera 227 may be stored in a server (not illustrated) in association with a shooting position, a shooting orientation, and a shooting date and time, and the display control device 200 may receive the image data from the server based on the movement route of the own vehicle and display the image data on the display 226.

3.7. Variation 7

In the first example, an image is displayed on the display 226 installed on the side surface portion of the own vehicle. In place of this, however, a projector may be installed to display an image and the reproduction scroll bar display area on the side surface portion of the own vehicle. In this case, since an operation by touching the display 226 cannot be detected, for example, an operation of moving a hand, a foot, a head, a line of sight, or the like along the movement direction of the vehicle may be detected by a camera, an optical sensor, or the like installed in the vehicle, and when the movement direction of the vehicle is the forward direction, an operation of moving from the front to rear may be detected as the forward operation, and an operation of moving from the rear to front may be detected as the rewind operation. In addition, for example, the control unit 211 may recognize, as a forward operation, an operation of pressing a button A of a remote controller for operating the display control device 200, and may recognize, as a rewind operation, an operation of pressing a button B of the remote controller, and when the movement direction of the vehicle is switched, the control unit 211 may recognize, as a rewind operation, an operation of pressing the button A of the remote controller, and may recognize, as a forward operation, an operation of pressing the button B of the remote controller.

3.8. Variation 8

In the first example, the control unit 211 (example of "first display control means", "operation detection means", "movement direction detection means", and "switching means") displays an image obtained by shooting the outside of the vehicle (example of "moving body") in the vehicle, detects an operation (example of "first operation") of sliding leftward the thumbnail section 304 of the reproduction scroll bar 300, detects the movement direction, which is a direction in which the vehicle moves, switches, in accordance with the movement direction, the operation of sliding leftward between to be the forward operation of displaying an image shot after the image being displayed and to be the rewind operation of displaying an image shot before the image being displayed, and displays an image in accordance with the forward operation or the rewind operation.

In place of this, the display (lower left) 226LL and the display (lower right) 226RL for detecting the operation (example of "first operation") of sliding leftward the thumbnail section 304 of the reproduction scroll bar 300 are separated from the display control device 200. On the other hand, an operation detection device (not illustrated) further including a control unit (not illustrated. An example of the "output means" and includes a CPU, a ROM, and a RAM) that outputs, to the display control device 200, operation detection information indicating that the display (lower left) 226LL and the display (lower right) 226RL (example of "operation detection means") and the display (lower left) 226LL and the display (lower right) 226RL have detected the operation of sliding leftward the thumbnail section 304. Then, the control unit 211 of the display control device 200 does not detect the operation of sliding leftward the thumbnail section 304, and switches, in accordance with the movement direction of the vehicle, the operation of sliding leftward the thumbnail section 304 indicated by the operation detection information received from the operation detection device to be a forward operation of displaying an image shot after the image being displayed or a rewind operation of displaying an image shot before the image being displayed. In this case, even if the display control device 200 does not include the display (lower left) 226LL and the display (lower right) 226RL, it is possible to switch, in accordance with the movement direction of the vehicle, the operation of sliding leftward the thumbnail section 304 to be the forward operation or the rewind operation. Therefore, the operator can intuitively operate free from a feeling of strangeness the operation of displaying an image shot before or after the image being displayed.

3.9. Variation 9

The variation 9 is a variation related to the vehicle 280 in which wheels are installed under a floor portion 281 and the entire inner wall is covered with the display as shown in FIG. 18. Hereinafter, a plurality of cases of the variation 9 will be described with reference to FIGS. 18 to 23. Note that FIG. 18 is a view showing an example of the vehicle 280 having the entire inner wall covered with a seamless display.

FIG. 19 is a view of an example of the vehicle 280 having the entire inner wall covered with two displays and having the display joint 289 present in the front-rear direction of the vehicle as viewed from above. FIG. 20 is a view of an example of the vehicle 280 having the entire inner wall covered with the two displays and having the display joint 289 present in the right-left direction of the vehicle as viewed from above. FIG. 21 is a view of an example of a horizontally long vehicle 280 having the entire inner wall covered with the two displays and having the display joint 289 present in an oblique direction of the vehicle as viewed from above. FIG. 22 is a view of an example of a vertically long vehicle 280 having the entire inner wall covered with the two displays and having the display joint 289 present in an oblique direction of the vehicle as viewed from above. FIG. 23 is a view of an example of a vehicle 280 substantially the same in length in the vertical and horizontal directions having the entire inner wall covered with the two displays and having the display joint 289 present in an oblique direction of the vehicle as viewed from above.

3.9.1. Variation 9-1

As shown in FIG. 18, in a case where the entire inner wall (side surface portion, ceiling portion, and floor portion) of the vehicle 280 is covered with a seamless display, an image displayed on the display may be generated by, for example, shooting a view in all directions (360 degrees horizontally+ 360 degrees vertically) viewed from the vehicle 280 using a plurality of cameras 227 and combining images shot by the cameras. The control unit 211 displays a reproduction scroll bar 300C along the front-rear direction of the vehicle in any display area (except for a portion corresponding to the forward direction or the backward direction of the vehicle 280) of the display, and, similarly to the first example, switches the indications ("present" and "past") of a first button section 301C and a second button section 302C in accordance with the movement direction of the vehicle 280. Note that when the reproduction scroll bar is displayed in a portion corresponding to the forward direction or the backward direction of the vehicle 280, the display format of the reproduction scroll bar can be selected by the operator similarly to that of the variation 2-2. Furthermore, the reproduction scroll bar does not necessarily need to be displayed in any display area of the display, and the control tower 330 described in the variation 4 (FIG. 17) may be installed in the own vehicle and displayed on the displays 331L and 331R.

3.9.2. Variation 9-2

As shown in FIG. 19, in a case where the entire inner wall of the vehicle 280 is covered with the two displays 282A and 282B, and the joint 289 between the displays 282A and 282B is present in the front-rear direction of the vehicle, an image obtained by shooting the left side (including left front and left rear) as viewed from the vehicle 280 is displayed on the display 282A, and an image obtained by shooting the right side (includes right front and right rear) as viewed from the vehicle 280 is displayed on the display 282B. Then, the control unit 211 displays the reproduction scroll bar (not illustrated) in any area of each of the displays 282A and 282B along the front-rear direction of the vehicle, and, similarly to the first example, switches the indications ("present" and "past") of the first button section (not illustrated) and the second button section (not illustrated) in accordance with the movement direction of the vehicle 280.

Note that the reproduction scroll bar does not necessarily need to be displayed in any of the display areas of each of the displays 282A and 282B, and the control tower 330 described in the variation 4 (FIG. 17) may be installed in the own vehicle and displayed on the displays 331L and 331R.

3.9.3. Variation 9-3

As shown in FIG. 20, in a case where the entire inner wall of the vehicle 280 is covered with the two displays 282C and 282D, and the joint 289 between the displays 282C and 282D is present in the right-left direction of the vehicle, an image obtained by shooting the front side (front side on the left side and front side on the right side) as viewed from the vehicle 280 is displayed on the display 282C, and an image obtained by shooting the rear side (rear side on left side and rear side on right side) as viewed from the vehicle 280 is displayed on the display 282D. Then, the control unit 211 displays the reproduction scroll bar (not illustrated) in any area of each of the displays 282C and 282D, and the display format of the reproduction scroll bar can be selected by the operator similarly to that of the variation 2-2. Note that the reproduction scroll bar does not necessarily need to be displayed in any of the display areas of each of the displays 282C and 282D, and the control tower 330 described in the variation 4 (FIG. 17) may be installed in the own vehicle and displayed on the displays 331L and 331R.

3.9.4. Variation 9-4

As shown in FIG. 21, in a case where the entire inner wall of the horizontally long vehicle 280 is covered with the two displays 282E and 282F, and the joint 289 between the displays 282E and 282F is present in the oblique direction of the vehicle, an image obtained by shooting the right front side (front, right side) as viewed from the vehicle 280 is displayed on the display 282E, and an image obtained by shooting the left rear side (rear, left side) as viewed from the vehicle 280 is displayed on the display 282F. Then, the control unit 211 displays the reproduction scroll bar (not illustrated) in any area of each of the displays 282E and 282F, and the display format of the reproduction scroll bar can be selected by the operator similarly to that of the variation 2-2. This is because when the horizontally long vehicle 280 is obliquely divided, the passenger is considered to recognize the display 282E as the front display and the display 282F as the rear display. Note that the reproduction scroll bar does not necessarily need to be displayed in any of the display areas of each of the displays 282E and 282F, and the control tower 330 described in the variation 4 (FIG. 17) may be installed in the own vehicle and displayed on the displays 331L and 331R.

3.9.5. Variation 9-5

As shown in FIG. 22, in a case where the entire inner wall of the vertically long vehicle 280 is covered with the two displays 282G and 282H, and the joint 289 between the displays 282G and 282H is present in the oblique direction of the vehicle, an image obtained by shooting the right front side (front, right side) as viewed from the vehicle 280 is displayed on the display 282H, and an image obtained by shooting a left rear side (rear, left side) as viewed from the vehicle 280 is displayed on the display 282G. Then, the control unit 211 displays the reproduction scroll bar (not illustrated) in any area of each of the displays 282G and 282H, and, similarly to the first example, switches the indications ("present" and "past") of the first button section (not illustrated) and the second button section (not illustrated) in accordance with the movement direction of the vehicle 280. This is because when the horizontally long vehicle 280 is obliquely divided, the passenger is considered to recognize the display 282G as the left display and the display 282H as the right display. Note that the reproduction scroll bar does not necessarily need to be displayed in any of the display areas of each of the displays 282G and 282H, and the control tower 330 described in the variation 4 (FIG. 17) may be installed in the own vehicle and displayed on the displays 331L and 331R.

3.9.6. Variation 9-6

As shown in FIG. 23, in a case where the entire inner wall of the vehicle 280 substantially the same in length in the vertical and horizontal directions is covered with the two displays 282J and 282K, and the joint 289 between the displays 282J and 282K is present in the oblique direction of the vehicle, an image obtained by shooting the right front side (front, right side) as viewed from the vehicle 280 is displayed on the display 282K, and an image obtained by shooting the left rear side (rear, left side) as viewed from the vehicle 280 is displayed on the display 282J. Then, the control unit 211 displays the reproduction scroll bar (not illustrated) in any area of each of the displays 282J and 282K, and the display format of the reproduction scroll bar can be selected by the operator similarly to that of the variation 2-2. This is because, when the vehicle 280 substantially the same in length in the vertical and horizontal directions is obliquely divided, there is an individual difference in which display of the front display or the right display the passenger recognizes the display 282K as, and which display of the rear display or the left display the passenger recognizes the display 282J as. Note that the reproduction scroll bar does not necessarily need to be displayed in any of the display areas of each of the displays 282J and 282K, and the control tower 330 described in the variation 4 (FIG. 17) may be installed in the own vehicle and displayed on the displays 331L and 331R.

3.10. Variation 10

The variation 10 is a variation related to a vehicle in which a display 291 is installed over the front surface portion and the left surface portion of the vehicle as shown in FIG. 24. Note that although different displays are installed over the front surface portion and the right surface portion of the vehicle, the difference only lies in whether it is left and right, and thus the description thereof will be omitted. In addition, another display may be installed over the rear surface portion and the left side surface portion or over the rear surface portion and the right side surface portion of the vehicle.

Touchscreen displays 292A to 292E that display a reproduction scroll bar are installed at left, right, and lower positions of the display 291. FIG. 24 illustrates five touchscreen displays that display a reproduction scroll bar, but some of them may be installed.

The display 291 displays an image obtained by shooting the left front direction of the vehicle by the camera 227 not illustrated.

The touchscreen displays 292A to 292E display a reproduction scroll bar in accordance with the movement direction of the vehicle. For example, when the vehicle moves in the direction (forward direction) indicated by an arrow 294A, at least some of the touchscreen displays 292B, 292C, and 292D display the reproduction scroll bar. Then, when having detected that the movement direction of the vehicle has been switched from the direction (forward direction) indicated by the arrow 294A to the direction (backward direction) opposite to the direction indicated by the arrow 294A (or vice versa), the control unit 211 switches the operation of sliding the thumbnail portion of the reproduction scroll bar displayed on, for example, the touchscreen displays 292B, 292C, and 292D from the rewind operation to the forward operation or from the forward operation to the rewind operation. For example, when the vehicle moves in the direction indicated by an arrow 294B (left side surface direction), at least some of the touchscreen displays 292A, 292D, 292E display the reproduction scroll bar. Then, when having detected that the movement direction of the vehicle has been switched from the direction (left side surface direction) indicated by the arrow 294B to the direction (right side surface direction) opposite to the direction indicated by the arrow 294B (or vice versa), the control unit 211 switches the operation of sliding the thumbnail portion of the reproduction scroll bar displayed on, for example, the touchscreen displays 292A, 292D, and 292E from the rewind operation to the forward operation or from the forward operation to the rewind operation.

Note that the control of the control unit 211 when displaying the reproduction scroll bar on the vertically long touchscreen displays 292A and 292B is similar to the control when displaying the reproduction scroll bar 300B on the touchscreen display 261 described in the variation 2-2 (FIG. 14), and thus the description thereof is omitted. In addition, the control of the control unit 211 when displaying the reproduction scroll bar on the horizontally long touchscreen displays 292C, 292D, and 292E is similar to the control when displaying the reproduction scroll bar 300 on the display 226LL described in the first example (FIG. 3), and thus the description thereof is omitted.

EXPLANATION OF REFERENCE NUMERALS 1 display control device
101 first display control means
102 operation detection means
103 movement direction detection means
104 switching means
200 display control device
211 control unit
211a CPU
211b ROM
211c RAM
212 storage unit
213 input unit
214 display unit
214a graphics controller
214b buffer memory
215 communication unit
220 input/output interface unit
221 vehicle speed sensor
222 angular velocity sensor
223 acceleration sensor
224 steering angle sensor
225 global navigation satellite system (GNSS) reception unit
226 display
227 camera
400 mobile terminal
401 control unit
402 storage unit
403 sensor
404 touchscreen display
405 communication unit

The invention claimed is:

1. A display control device comprising:
a first display control means that displays an image obtained by shooting an outside of a moving body in the moving body;
an operation detection means that detects a first operation;
a movement direction detection means that detects a movement direction, which is a movement direction of the moving body; and
a switching means that switches, in accordance with the movement direction, the first operation between to be a forward operation of displaying an image shot after an image being displayed and to be a rewind operation of displaying an image shot before an image being displayed, wherein
the first display control means displays an image in accordance with the forward operation or the rewind operation.

2. The display control device according to claim 1, wherein
the image is an image continuously shot from the moving body.

3. The display control device according to claim 1, wherein
the operation detection means further detects a second operation different from the first operation, and
the switching means switches the first operation to be the forward operation and the second operation to be the rewind operation when the movement direction is a first direction, and switches the first operation to be the rewind operation and the second operation to be the forward operation when the movement direction is switched from the first direction to a second direction different from the first direction.

4. The display control device according to claim 3, wherein
the operation detection means includes a first detection unit that detects the first operation and a second detection unit that detects the second operation, and
it is presented that the first detection unit corresponds to the forward operation and the second detection unit corresponds to the rewind operation when the movement direction is a first direction, and it is presented that the first detection unit corresponds to the rewind operation and the second detection unit corresponds to the forward operation when the movement direction is switched from the first direction to the second direction.

5. The display control device according to claim 1 further comprising:
a second display control means that displays, separately from an image displayed by the first display control means, a plurality of the images side by side in order of shooting in the moving body, and displays, distinguishably from other images, an image corresponding to an image displayed by the first control means among the images to be displayed side by side.

6. The display control device according to claim 1, wherein
the first display control means displays the image on a display device that displays the image on at least any of a side surface portion, a ceiling portion, and a floor surface portion with reference to the movement direction in the moving body.

7. An operation detection device comprising the operation detection means according to claim 1 further comprising:
- an output means that outputs operation detection information indicating that the operation detection means has detected the first operation to the switching means of the display control device including the first display control means, the movement direction detection means, and the switching means.

8. A display control method by a display control device, the display control method comprising:
- a first display control step of displaying an image obtained by shooting an outside of a moving body in the moving body;
- an operation detection step of detecting a first operation;
- a movement direction detection step of detecting a movement direction, which is a movement direction of the moving body; and
- a switching step of switching, in accordance with the movement direction, the first operation between to be a forward operation of displaying an image shot after an image being displayed and to be a rewind operation of displaying an image shot before an image being displayed, wherein
- the first display control step is of displaying an image in accordance with the forward operation or the rewind operation.

* * * * *